(12) United States Patent  (10) Patent No.: US 6,460,157 B1
Chen et al.  (45) Date of Patent: Oct. 1, 2002

(54) METHOD SYSTEM AND PROGRAM PRODUCTS FOR ERROR CORRECTION CODE CONVERSION

(75) Inventors: Chin-Long Chen, Fishkill; Mu-Yue Hsiao, Poughkeepsie; Patrick J. Meaney, Poughkeepsie; William Wu Shen, Poughkeepsie, all of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/450,548

(22) Filed: Nov. 30, 1999

(51) Int. Cl.[7] .......................... H03M 13/00; G11C 29/00
(52) U.S. Cl. ...................................... 714/758; 714/763
(58) Field of Search ................... 714/758, 777, 714/781, 785, 807, 808, 820, 763, 773

(56) References Cited

U.S. PATENT DOCUMENTS

| | | | |
|---|---|---|---|
| 3,851,306 A | * 11/1974 | Patel | 714/757 |
| 4,241,446 A | * 12/1980 | Trubisky | 714/777 |
| 4,345,328 A | * 8/1982 | White | 714/758 |
| 4,464,753 A | 8/1984 | Chen | 371/38 |
| 4,862,463 A | 8/1989 | Chen | 371/38 |
| 5,068,855 A | * 11/1991 | Kashida et al. | 714/755 |
| 5,155,734 A | * 10/1992 | Kashida et al. | 714/52 |
| 5,361,266 A | * 11/1994 | Kodama et al. | 714/758 |
| 5,384,788 A | * 1/1995 | Parks et al. | 714/757 |
| 5,588,010 A | * 12/1996 | Hardell et al. | 714/752 |
| 5,694,405 A | * 12/1997 | Kuwahara | 714/752 |
| 5,774,481 A | 6/1998 | Meaney et al. | 371/40.1 |
| 5,841,795 A | 11/1998 | Olarig et al. | 370/40.13 |

OTHER PUBLICATIONS

Chen, C.L., and Hsiao, M.Y., Error–Correcting Codes for Semiconductor Memory Applications: A State-of-the-Art Review, 28 IBM Journal of Research and Development, 124 (Mar., 1984).

* cited by examiner

*Primary Examiner*—Albert Decady
*Assistant Examiner*—Cynthia Harris
(74) *Attorney, Agent, or Firm*—Lawrence D. Cutter, Esq.; Kevin P. Radigan, Esq.; Heslin Rothenberg Farley & Mesiti P.C.

(57) ABSTRACT

Data is protected during conversion from one or more source error correction codes to one or more destination error correction codes by generating check bits of the destination error correction codes prior to a detection for errors in the source error correction codes. After commencing generation of these check bits, a detection is made for any errors in the source error correction codes. These errors are subsequently corrected in the destination error correction codes by complementing the erroneous bits of the destination error correction code. In addition, various logic reduction techniques may also be implemented to increase efficiency.

49 Claims, 18 Drawing Sheets

CHIPS

DATA BITS | CHECK BITS

DATA IN
10, 12, 14, 16, 18, 20, 22, 24, 36, 38, 40, 42, 44
46, 48, 50, 62, 64, 66, 68, 70, 72, 74, 76, 88, 90
92, 94, 96, 98, 100, 102, 114, 116, 118, 120, 122, 124, 126, 128

$$H = \begin{bmatrix} M_0 M_0 M_0 M_0 M_0 V_0 V_0 \\ M_1 M_5 M_4 M_3 M_2 V_0 V_0 \\ M_2 M_1 M_5 M_4 M_3 V_0 V_1 \\ M_3 M_2 M_1 M_5 M_4 V_0 V_1 \\ M_4 M_3 M_2 M_1 M_5 V_1 V_0 \\ M_5 M_4 M_3 M_2 M_1 V_1 V_0 \end{bmatrix} I_{12}$$

$$M_0 = \begin{bmatrix} 000000000001010101010101010 \\ 000000000001010101010101 \end{bmatrix}$$

$$M_1 = \begin{bmatrix} 0010111010000100100110100 \\ 0001101011000011100101100 \end{bmatrix}$$

$$M_2 = \begin{bmatrix} 0000000110101100000110101 1 \\ 0000001101011000011010110 \end{bmatrix}$$

$$M_3 = \begin{bmatrix} 1010001010100011100000010 \\ 0101000101010010010000001 \end{bmatrix}$$

$$M_4 = \begin{bmatrix} 1000100010001000111110101 0 \\ 0100010001000100101001010 1 \end{bmatrix}$$

$$M_5 = \begin{bmatrix} 10100100100000000010011111 \\ 01011100010000000011111010 \end{bmatrix}$$

$$V_0 = \begin{bmatrix} 10 \\ 01 \end{bmatrix}$$

$$V_1 = \begin{bmatrix} 01 \\ 11 \end{bmatrix}$$

$$I_{12} = \begin{bmatrix} 100000000000 \\ 010000000000 \\ 001000000000 \\ 000100000000 \\ 000010000000 \\ 000001000000 \\ 000000100000 \\ 000000010000 \\ 000000001000 \\ 000000000100 \\ 000000000010 \\ 000000000001 \end{bmatrix}$$

*fig. 10*

| 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|----|----|----|----|----|----|----|----|----|
| 000 | 000 | 000 | 000 | 000 | 101 | 101 | 101 | 101 | 101 | 101 | 101 | 101 | 000 | 000 | 000 | 000 | 000 | 101 |
| 000 | 000 | 000 | 000 | 000 | 011 | 011 | 011 | 011 | 011 | 011 | 011 | 101 | 000 | 000 | 000 | 000 | 000 | 011 |
| 000 | 101 | 110 | 110 | 011 | 000 | 000 | 101 | 011 | 110 | 110 | 011 | 011 | 101 | 101 | 011 | 000 | 101 | 000 |
| 000 | 011 | 101 | 101 | 110 | 000 | 000 | 011 | 011 | 011 | 011 | 011 | 000 | 011 | 011 | 110 | 000 | 000 | 000 |
| 000 | 000 | 000 | 011 | 101 | 000 | 000 | 000 | 110 | 000 | 110 | 110 | 000 | 000 | 101 | 110 | 000 | 101 | 000 |
| 000 | 000 | 000 | 110 | 011 | 101 | 110 | 000 | 000 | 101 | 101 | 101 | 110 | 011 | 011 | 101 | 110 | 011 | 000 |
| 000 | 000 | 000 | 101 | 101 | 101 | 101 | 000 | 000 | 101 | 101 | 101 | 000 | 000 | 101 | 101 | 101 | 110 | 000 |
| 101 | 101 | 000 | 101 | 011 | 011 | 000 | 110 | 101 | 000 | 000 | 000 | 101 | 011 | 000 | 000 | 011 | 101 | 101 |
| 011 | 011 | 000 | 011 | 011 | 000 | 000 | 110 | 011 | 000 | 000 | 101 | 000 | 000 | 000 | 000 | 110 | 011 | 011 |
| 101 | 000 | 101 | 011 | 101 | 000 | 110 | 101 | 101 | 101 | 101 | 101 | 101 | 101 | 101 | 000 | 101 | 101 | 101 |
| 011 | 000 | 011 | 000 | 011 | 000 | 110 | 110 | 011 | 011 | 011 | 011 | 011 | 011 | 011 | 000 | 101 | 101 | 011 |
| 000 | 000 | 000 | 000 | 101 | 000 | 000 | 000 | 101 | 011 | 110 | 110 | 110 | 000 | 000 | 101 | 000 | 101 | 101 |
| 101 | 101 | 101 | 101 | 000 | 000 | 000 | 000 | 000 | 011 | 101 | 101 | 101 | 101 | 101 | 101 | 101 | 101 | 000 |
| 011 | 011 | 011 | 011 | 011 | 000 | 000 | 000 | 000 | 110 | 011 | 110 | 110 | 011 | 000 | 011 | 000 | 011 | 000 |

*fig. 11A*

| 19 | 20 | 21 | 22 | 23 | 24 | 25 | 26 | 27 | 28 | 29 | 30 | 31 | 32 | 33 | 34 | 35 | 36 | 37 |
|----|----|----|----|----|----|----|----|----|----|----|----|----|----|----|----|----|----|----|
| 101 | 101 | 101 | 101 | 101 | 101 | 101 | 000 | 000 | 000 | 000 | 000 | 101 | 101 | 101 | 101 | 101 | 101 | 101 |
| 011 | 011 | 011 | 011 | 011 | 011 | 011 | 000 | 000 | 000 | 000 | 000 | 011 | 011 | 011 | 011 | 011 | 011 | 011 |
| 000 | 000 | 000 | 101 | 011 | 110 | 110 | 000 | 000 | 000 | 000 | 101 | 000 | 101 | 011 | 011 | 011 | 011 | 011 |
| 000 | 000 | 000 | 011 | 011 | 101 | 101 | 101 | 101 | 101 | 101 | 011 | 101 | 011 | 000 | 110 | 110 | 101 | 101 |
| 000 | 101 | 011 | 000 | 110 | 101 | 000 | 011 | 011 | 011 | 011 | 011 | 000 | 000 | 000 | 101 | 101 | 101 | 101 |
| 000 | 011 | 110 | 000 | 110 | 000 | 000 | 110 | 110 | 000 | 101 | 000 | 000 | 000 | 000 | 000 | 000 | 011 | 011 |
| 110 | 000 | 000 | 011 | 101 | 110 | 110 | 011 | 011 | 000 | 011 | 011 | 000 | 000 | 000 | 000 | 011 | 110 | 110 |
| 101 | 000 | 000 | 110 | 101 | 101 | 000 | 000 | 110 | 110 | 110 | 101 | 000 | 000 | 101 | 011 | 000 | 000 | 101 |
| 000 | 101 | 101 | 000 | 101 | 101 | 101 | 000 | 101 | 110 | 101 | 101 | 101 | 110 | 011 | 110 | 000 | 110 | 110 |
| 000 | 000 | 000 | 011 | 101 | 000 | 000 | 101 | 101 | 101 | 101 | 011 | 011 | 101 | 000 | 000 | 000 | 101 | 101 |
| 101 | 110 | 110 | 011 | 011 | 011 | 011 | 101 | 011 | 000 | 101 | 101 | 101 | 000 | 110 | 101 | 110 | 101 | 101 |
| 000 | 101 | 101 | 101 | 101 | 101 | 101 | 011 | 011 | 000 | 011 | 011 | 011 | 000 | 000 | 011 | 000 | 011 | 011 |
| 011 | 000 | 101 | 011 | 011 | 011 | 011 | 011 | 011 | 011 | 011 | 011 | 011 | 000 | 101 | 101 | 000 | 000 | 000 |

*fig. 11B*

| | 38 | 39 | 40 | 41 | 42 | 43 | 44 | 45 | 46 | 47 | 48 | 49 | 50 | 51 | 52 | 53 | 54 | 55 | 56 |
|---|---|---|---|---|---|---|---|---|---|---|---|---|---|---|---|---|---|---|---|
| | 101 | 000 | 000 | 000 | 000 | 000 | 101 | 101 | 101 | 101 | 101 | 101 | 101 | 101 | 000 | 000 | 000 | 000 | 000 |
| | 011 | 000 | 000 | 000 | 000 | 000 | 011 | 011 | 011 | 011 | 011 | 011 | 011 | 011 | 000 | 000 | 000 | 000 | 000 |
| | 101 | 101 | 101 | 000 | 101 | 101 | 101 | 000 | 110 | 110 | 000 | 000 | 000 | 011 | 000 | 000 | 000 | 011 | 101 |
| | 011 | 011 | 011 | 000 | 011 | 011 | 011 | 000 | 101 | 101 | 000 | 000 | 000 | 101 | 000 | 000 | 000 | 110 | 011 |
| | 110 | 101 | 000 | 101 | 000 | 000 | 000 | 101 | 101 | 000 | 110 | 101 | 101 | 101 | 101 | 101 | 000 | 101 | 101 |
| | 101 | 011 | 000 | 101 | 000 | 000 | 000 | 011 | 011 | 000 | 101 | 011 | 011 | 011 | 011 | 011 | 000 | 011 | 011 |
| | 000 | 101 | 011 | 011 | 011 | 000 | 000 | 011 | 000 | 101 | 101 | 011 | 110 | 110 | 101 | 000 | 101 | 101 | 101 |
| | 000 | 011 | 011 | 110 | 110 | 000 | 000 | 101 | 000 | 110 | 011 | 110 | 011 | 101 | 011 | 000 | 011 | 000 | 011 |
| | 110 | 000 | 101 | 110 | 110 | 011 | 000 | 000 | 101 | 000 | 000 | 110 | 101 | 000 | 101 | 101 | 101 | 000 | 101 |
| | 101 | 000 | 011 | 101 | 101 | 110 | 000 | 000 | 011 | 000 | 000 | 101 | 011 | 000 | 011 | 011 | 011 | 000 | 011 |
| | 000 | 000 | 000 | 000 | 101 | 000 | 000 | 000 | 101 | 011 | 011 | 101 | 110 | 000 | 000 | 000 | 110 | 110 | 110 |
| | 000 | 000 | 000 | 000 | 011 | 000 | 000 | 000 | 011 | 110 | 110 | 011 | 101 | 000 | 000 | 000 | 110 | 110 | 110 |
| | 110 | 000 | 000 | 000 | 000 | 101 | 000 | 101 | 101 | 000 | 000 | 000 | 101 | 110 | 110 | 000 | 110 | 110 | 110 |
| | 101 | 000 | 000 | 000 | 000 | 110 | 000 | 110 | 110 | 000 | 000 | 000 | 110 | 101 | 101 | 000 | 101 | 101 | 101 |
| | 101 | 000 | 000 | 000 | 110 | 011 | 101 | 101 | 000 | 011 | 011 | 011 | 011 | 101 | 000 | 011 | 101 | 110 | 101 |
| | 011 | 000 | 000 | 000 | 110 | 011 | 011 | 011 | 000 | 110 | 110 | 011 | 011 | 011 | 000 | 011 | 101 | 101 | 110 |

*fig. 11C*

| 57 | 58 | 59 | 60 | 61 | 62 | 63 | 64 | 65 | 66 | 67 | 68 | 69 | 70 | 71 | 72 |
|---|---|---|---|---|---|---|---|---|---|---|---|---|---|---|---|
| 101 | 101 | 101 | 101 | 101 | 101 | 101 | 101 | 101 | 101 | 101 | 000 | 000 | 000 | 000 | 000 |
| 011 | 011 | 011 | 011 | 011 | 011 | 011 | 011 | 011 | 011 | 011 | 000 | 000 | 000 | 000 | 000 |
| 101 | 110 | 000 | 000 | 011 | 011 | 011 | 110 | 011 | 011 | 000 | 101 | 000 | 000 | 000 | 000 |
| 011 | 000 | 000 | 011 | 101 | 101 | 101 | 101 | 101 | 101 | 000 | 011 | 000 | 000 | 000 | 000 |
| 101 | 000 | 110 | 101 | 011 | 011 | 011 | 011 | 011 | 011 | 000 | 000 | 101 | 000 | 000 | 000 |
| 011 | 000 | 101 | 011 | 000 | 000 | 000 | 101 | 101 | 101 | 000 | 000 | 011 | 000 | 000 | 000 |
| 101 | 000 | 101 | 110 | 110 | 101 | 101 | 011 | 011 | 011 | 000 | 000 | 000 | 101 | 000 | 000 |
| 011 | 000 | 011 | 101 | 101 | 011 | 011 | 101 | 101 | 110 | 000 | 000 | 000 | 011 | 000 | 000 |
| 000 | 101 | 000 | 101 | 011 | 011 | 011 | 011 | 011 | 011 | 000 | 000 | 000 | 000 | 101 | 000 |
| 000 | 011 | 000 | 101 | 101 | 101 | 101 | 110 | 110 | 101 | 000 | 000 | 000 | 000 | 011 | 000 |
| 000 | 000 | 000 | 011 | 011 | 011 | 110 | 101 | 101 | 011 | 000 | 000 | 000 | 000 | 000 | 101 |
| 000 | 000 | 000 | 000 | 101 | 101 | 101 | 011 | 011 | 000 | 000 | 000 | 000 | 000 | 000 | 011 |
| 000 | 000 | 101 | 011 | 000 | 011 | 011 | 101 | 101 | 101 | 000 | 000 | 000 | 000 | 000 | 000 |
| 000 | 000 | 011 | 110 | 110 | 110 | 110 | 110 | 110 | 011 | 000 | 000 | 000 | 000 | 000 | 000 | fig. 11D $$H = \begin{bmatrix} M_0V_0 & M_0V_0 & M_0V_0 & M_0V_0 & M_0V_0 \\ M_1V_0 & M_5V_1 & M_4V_1 & M_3V_0 & M_2V_0 \\ M_2V_0 & M_1V_0 & M_5V_1 & M_4V_1 & M_3V_0 \\ M_3V_0 & M_2V_0 & M_1V_0 & M_5V_1 & M_4V_1 \\ M_4V_1 & M_3V_0 & M_2V_0 & M_1V_0 & M_5V_1 \\ M_5V_1 & M_4V_1 & M_3V_0 & M_2V_0 & M_1V_0 \end{bmatrix} I_{12}$$

$$M_0 = \begin{bmatrix} 0000000000101010101010 \\ 0000000000010101010101 \end{bmatrix}$$

$$M_1 = \begin{bmatrix} 0010111010000100100110100 \\ 0001101011000011100101100 \end{bmatrix}$$

$$M_2 = \begin{bmatrix} 00000001101011000001101011 \\ 00000011010110000011010110 \end{bmatrix}$$

$$M_3 = \begin{bmatrix} 101000101010001110000000010 \\ 010100010101001001000000001 \end{bmatrix}$$

$$M_4 = \begin{bmatrix} 100010001000100011111101010 \\ 010001000100010010100101010 \end{bmatrix}$$

$$M_5 = \begin{bmatrix} 10100100100000000010011111 \\ 01011100010000000001111010 \end{bmatrix}$$

$$V_0 = \begin{bmatrix} 10 \\ 01 \end{bmatrix}$$

$$V_1 = \begin{bmatrix} 01 \\ 11 \end{bmatrix}$$

$$I_{12} = \begin{bmatrix} 100000000000 \\ 010000000000 \\ 001000000000 \\ 000100000000 \\ 000010000000 \\ 000001000000 \\ 000000100000 \\ 000000010000 \\ 000000001000 \\ 000000000100 \\ 000000000010 \\ 000000000001 \end{bmatrix}$$

*fig. 12*

$$H = \begin{bmatrix} M_0V_0V_0 & M_0V_0V_0 & M_0V_0V_0 & M_0V_0V_0 & M_0V_0V_0 \\ M_1V_0V_0 & M_5V_1V_2 & M_4V_1V_2 & M_3V_0V_0 & M_2V_0V_1 \\ M_2V_0V_1 & M_1V_0V_0 & M_5V_1V_2 & M_4V_1V_2 & M_3V_0V_0 \\ M_3V_0V_0 & M_2V_0V_1 & M_1V_0V_0 & M_5V_1V_2 & M_4V_1V_2 \\ M_4V_1V_2 & M_3V_0V_0 & M_2V_0V_1 & M_1V_0V_0 & M_5V_1V_2 \\ M_5V_1V_2 & M_4V_1V_2 & M_3V_0V_0 & M_2V_0V_1 & M_1V_0V_0 \end{bmatrix} I_{12}$$

$$M_0 = \begin{bmatrix} 0000000000010101010101010 \\ 0000000000010101010101101 \end{bmatrix}$$

$$M_1 = \begin{bmatrix} 0010111101000010010010100 \\ 0001101011000011100101100 \end{bmatrix}$$

$$M_2 = \begin{bmatrix} 0000000110101100000110101 1 \\ 0000000110101100000110101 10 \end{bmatrix}$$

$$M_3 = \begin{bmatrix} 101000101010001110000000 10 \\ 010100010101001001000000 01 \end{bmatrix}$$

$$M_4 = \begin{bmatrix} 100010001000100011111010 10 \\ 010001000100010010100101 01 \end{bmatrix}$$

$$M_5 = \begin{bmatrix} 101001001000000000010011 111 \\ 010111000100000000001111 010 \end{bmatrix}$$

$$V_0 = \begin{bmatrix} 10 \\ 01 \end{bmatrix}$$

$$V_1 = \begin{bmatrix} 01 \\ 11 \end{bmatrix}$$

$$V_2 = \begin{bmatrix} 11 \\ 10 \end{bmatrix}$$

$$I_{12} = \begin{bmatrix} 100000000000 \\ 010000000000 \\ 001000000000 \\ 000100000000 \\ 000010000000 \\ 000001000000 \\ 000000100000 \\ 000000010000 \\ 000000001000 \\ 000000000100 \\ 000000000010 \\ 000000000001 \end{bmatrix}$$

fig. 13

METHOD SYSTEM AND PROGRAM PRODUCTS FOR ERROR CORRECTION CODE CONVERSION

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Single Symbol Correction Double Symbol Detection Code Employing A Modular H-Matrix," Chen et al., Ser. No. 09/451,133;

"Detecting Address Faults In An ECC-Protected Memory," Chen et al., Ser. No. 09/451,261; and "Generating Special Uncorrectable Error Codes For Failure Isolation," Chen et al., Ser. No. 09/452,079.

TECHNICAL FIELD

This invention relates, in general, to computer error correction codes and, in particular, to conversions from one or more source error correction codes to one or more destination error correction codes.

BACKGROUND ART

The small size of computer transistors and capacitors, combined with transient electrical and electromagnetic phenomena cause occasional errors in stored information in computer memory systems. Therefore, even well-designed and generally reliable memory systems are susceptible to memory device failures.

In an effort to minimize the effects of these memory device failures, various error checking schemes have been developed to detect, and in some cases correct, errors in messages read from memory. The simplest error detection scheme is the parity bit. A parity bit is an extra bit included with a binary data message or data word to make the total number of 1's in the message either odd or even. For "even parity" systems, the parity bit is set to make the total number of 1's in the message even. For "odd parity" systems, the parity bit is set to make the total number of 1's in the message odd. For example, in a system utilizing odd parity, a message having two 1's would have its parity bit set to 1, thereby making the total number of 1's odd. Then, the message including the parity bit is transmitted and subsequently checked at the receiving end for errors. An error results if the parity of the data bits in the message does not correspond to the parity bit transmitted. As a result, single bit errors can be detected. However, since there is no way to detect which particular bit is in error, correction is not possible. Furthermore, if two or any even number of bits are in error, the parity will be correct and no error will be detected. Parity therefore is capable of detecting only odd numbers of errors and is not capable of correcting any bits determined to be in error.

Error correction codes (ECCs) have thus been developed to not only detect but also correct bits determined to be in error. ECCs utilize multiple parity check bits stored with the data message in memory. Each check bit is a parity bit for a group of bits in the data message. When the message is read from memory, the parity of each group, including the check bit, is evaluated. If the parity is correct for all of the groups, it signifies that no detectable error has occurred. If one or more of the newly generated parity values are incorrect, a unique pattern called a syndrome results which may be used to identify the bit in error. Upon detection of the particular bit in error, the error may be corrected by complementing the erroneous bit.

A widely used type of ECC utilized in error control in digital systems is based on the codes devised by R. W. Hamming, and thus take the name "Hamming codes". One particular subclass of Hamming codes includes the single error correcting and double error detecting (SEC-DED) codes. As their name suggests, these codes may be utilized not only to correct any single bit error but also to detect double bit errors.

Another type of well-known ECC is the single symbol correction and double symbol detection (SSC-DSD) codes which are used to correct single symbol errors and detect double errors. In systems implementing these types of codes, the symbol represents a multiple bit package or chip. Hence, as the name implies, an SSC-DSD code in a system utilizing n bit symbols would be capable of correcting n bits in a single symbol and detecting errors occurring in double symbols.

As can be expected, the structure and format of these ECCs depend on and vary with the bandwidth supported by the particular component in which the individual ECCs have been implemented. For instance, depending on the architecture of the implementing system, data fetched out of main memory may be in the form of 128 bit words requiring the use of 12 ECC check bits for protection whereas data fetched out of an L2 cache may take the form of 64 bit words requiring the use of 8 ECC check bits for protection. As can be imagined, problems often arise during transmission between components operating under differing bandwidths.

In a typical conversion process, when transmitting protected data between components operating under differing bandwidths (and thus differing ECCS), a source ECC is first decoded with any errors occurring in the data being corrected at that time. Then, the data is converted to meet the format of the destination component and later protected with an ECC scheme corresponding to that format. Thus, a period of time exists after error detection and correction at the source component but before the implementation of error protection in the destination component where data corruption may occur. Under these circumstances, erroneous data would appear as being error-free to the destination component and would subsequently become protected under the destination ECC scheme even with the existence of corrupted data.

Thus, a need exists for a conversion mechanism capable of protecting data being transmitted from components operating under one ECC scheme to components operating under different ECC schemes. In addition, as speed in processing is always desirable, a further need exists for such a mechanism which converts between ECC schemes rapidly and efficiently without the use of unnecessary or redundant logic.

SUMMARY OF THE INVENTION

A data protection capability for protecting data during conversion between different error correction codes (ECCs) is provided which generates the destination ECC prior to error detection and correction in the source ECC. Errors detected in the source ECC are then corrected in the destination ECC thereby resulting in an overlap between the protection imparted by the differing error correction schemes. In addition, by commencing generation of the destination ECC before error detection in the source ECC, the conversion occurs in parallel thus resulting in a time savings over serial processes. Finally, various logic reduction techniques are implemented to further reduce the amount of time required during conversion.

In one example, a method of protecting data during conversion from at least one source error correction code to at least one destination error correction code, wherein the at least one source error correction code and the at least one destination error correction code both comprise a set of data bits representing the data, and wherein the at least one destination error correction code further comprises a plurality of destination check bits to be generated from the set of data bits during conversion for protecting the data after conversion is disclosed. This method comprises: generating, during conversion from the at least one source error correction code to the at least one destination error correction code, the plurality of destination check bits prior to a detection for errors in the at least one source is error correction code to ensure that the data bits are protected throughout the conversion; detecting any errors in the at least one source error correction code; and correcting any errors, detected in the at least one source error correction code, by complementing any erroneous bits in the at least one destination error correction code.

In another example, a system for protecting data during conversion from at least one source error correction code to at least one destination error correction code, wherein the at least one source error correction code and the at least one destination error correction code both comprise a set of data bits representing the data, and wherein the at least one destination error correction code further comprises a plurality of destination check bits to be generated from the set of data bits during conversion for protecting the data after conversion is disclosed. This system comprises: means for generating, during conversion from the at least one source error correction code to the at least one destination error correction code, the plurality of destination check bits prior to a detection for errors in the at least one source error correction code to ensure that the data bits are protected throughout the conversion; means for detecting any errors in the at least one source error correction code; and means for correcting any errors, detected in the at least one source error correction code, by complementing any erroneous bits in the at least one destination error correction code.

In yet another example, an article of manufacture including a computer usable medium having computer readable program code means embodied therein for protecting data during conversion from at least one source error correction code to at least one destination error correction code, wherein the at least one source error correction code and the at least one destination error correction code both comprise a set of data bits representing the data, and wherein the at least one destination error correction code further comprises a plurality of destination check bits to be generated from the set of data bits during conversion for protecting the data after conversion is disclosed. This computer readable program code means in the article of manufacture comprises: computer readable program code means for generating, during conversion from the at least one source error correction code to the at least one destination error correction code, the plurality of destination check bits prior to a detection for errors in the at least one source error correction code to ensure that the data bits are protected throughout the conversion; computer readable program code means for detecting any errors in the at least one source error correction code; and computer readable program code means for correcting any errors, detected in the at least one source error correction code, by complementing any erroneous bits in the at least one destination error correction code.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 10 depicts one example of an H-matrix according the present invention;

FIGS. 11A–11D depict one example of a syndrome decoding table generated according to the H-matrix of FIG. 10;

FIG. 12 depicts another example of an H-matrix according the present invention;

FIG. 13 depicts yet another example of an H-matrix according the present invention;

BEST MODE FOR CARRYING OUT THE INVENTION

In accordance with the principles of the present invention, a data protection capability for protecting data during conversion between different error correction codes (ECCs) is provided. To provide protection (i.e., the detection and subsequent correction of erroneous data) throughout the conversion process, the present invention first generates the destination ECC prior to error detection and any correction in the source ECC. Then, errors detected in the source ECC are corrected in the destination ECC. This generation of a destination ECC in parallel with error identification in the source ECC results not only in an overlap in protection but also reduces the amount of time needed for conversion than would have been required if destination ECC generation occurred after error detection in the source ECC. Furthermore, various logic reduction techniques may be implemented to further reduce the amount of time required during conversion.

Figure 1:
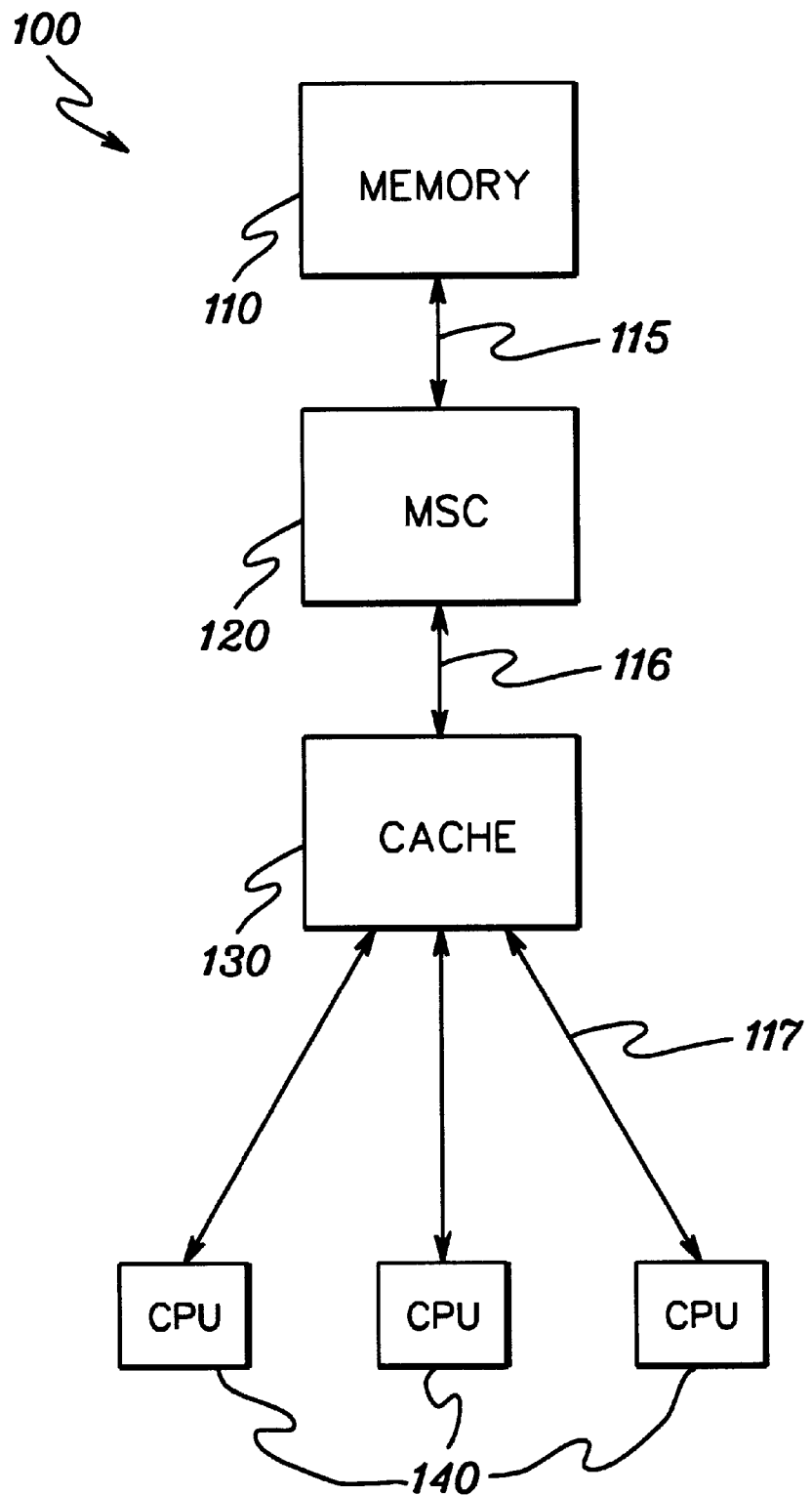
FIG. 1 depicts one example of a computer system in which error correction and/or detection in accordance with the principles of the present invention may be utilized.

FIG. 1 shows a block diagram representation of a computer system 100 utilizing the error correction code of the present invention. In one embodiment, computer system 100 includes a memory 110 connected to a main storage controller (MSC) 120 via a data bus 115, a cache 130 connected to MSC 120 via a data bus 117, and a plurality of central processing units (CPUs) 140 connected to cache 130 via data buses 117. Data buses 117 are used to communicate data between MSC 120 and cache 130 as well as between cache 130 and CPUs 140, respectively, and in this regard may typically be 72 bits wide. Communication of data between memory 110 and MSC 120, on the other hand, occurs via data bus 115. Thus, data bus 115 facilitates the transmission of data read from memory 110 by MSC 120 as well as data written to memory 110 by MSC 120.

Data bus 115, in one embodiment, is 146 bits wide but nevertheless may vary in width according to the requirements of the particular system while still receiving error protection under the ECC of the present invention. In this regard, the ECC of the present invention is specifically designed to meet the data requirements of a wide variety of servers including data buses having widths of, for example, 140, 142, 143, 144, 152, and 162 bits.

The data transmitted in computer system 100 is arranged into a data word having a size dependent on the particular data bus utilized by the system. Furthermore, the data word may be arranged into variably-sized symbols. For instance, in one example, the data word comprises a plurality of two bit symbols. Hence, in this example, a 146 bit data word would include 73 symbols.

Figure 2:
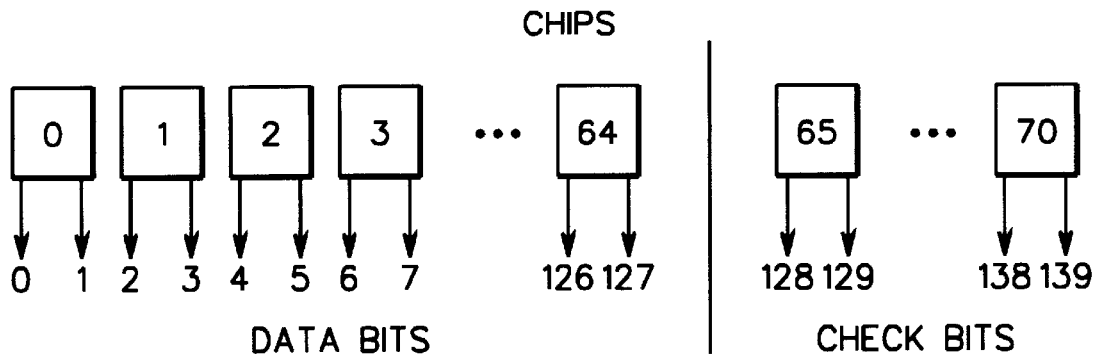
FIG. 2 depicts one example of a memory arrangement in accordance with the present invention.

As shown in FIG. 2, memory 110, for example, comprises a plurality of DRAM devices with each device storing a two-bit package of data on a single chip or symbol. For instance, data bits 0 and 1 are stored on chip 0, and similarly bits 2 and 3 are stored on chip 1. In addition, the embodiment shown in FIG. 2 depicts a 140 bit memory system which is arranged such that the first 128 bits (0–127) are used for data storage and the last 12 bits (128–139) are used to store a plurality of check bits.

In accordance with the principles of the present invention, the check bits are generated as data is transmitted from MSC 120 to memory 110. Upon generation, the check bits are stored, together with the transmitted data, in memory 110. As mentioned above, in the embodiment depicted in FIG. 2, twelve check bits are generated and stored on chips 65–70, with each check bit being associated with a group of data bits stored on chips 0–64. The generation of the check bits is discussed below in detail with reference to FIGS. 2, 3, 10, 12 and 13.

FIGS. 10, 12 and 13 depict various embodiments of an H-matrix generated in accordance with the principles of the present invention. In each of FIGS. 10, 12 and 13, the H-matrix is shown comprising a plurality of subsets arranged in a plurality of rows and columns. In addition, each of at least one of the rows comprises, in part, multiple iterations of one subset of the plurality of subsets, whereas the remainder of the rows comprises, in part, a cyclic permutation of all of the remaining subsets of the plurality of subsets.

In the example depicted in FIG. 10, one H-matrix is shown including a plurality of 2×26 modular matrices M0–M5, a plurality of 2×2 matrices V0–VL, and matrix I12, which represents a 12×12 identity matrix. As can be seen, the top row of the H-matrix in FIG. 10 comprises, in part, multiple iterations of subset M0 and the remainder of the rows comprises, in part, a cyclic permutation of the remaining subsets M1–M5. In addition to comprising the subsets M1–M5, the rows of the H-matrix also comprise various iterations of the V0 and V1 matrices, as well as the I12 matrix. Other examples of H-matrices generated according to the principles of the present invention are depicted in FIGS. 12 and 13. Similar to the example shown in FIG. 10, the embodiments depicted in FIGS. 12 and 13 also include a plurality of rows and columns with the top row comprising multiple iterations of one subset and with the remainder of the rows comprising a cyclic permutation of the remaining subsets. Furthermore, although each of the embodiments shown in FIGS. 10, 12 and 13 depicts a top row comprising, in part, multiple iterations of one subset, it is to be understood that the row comprising, in part, multiple iterations of one subset is not limited to the top row of the H-matrix and, to the contrary, any one of the rows of the H-matrix may comprise, in part, multiple iterations of one subset with the remaining rows comprising, in part, a cyclic permutation of the remaining subsets. Also, although each of the embodiments shown in FIGS. 10, 12 and 13 depict a particular arrangement of rows and columns, it is to be understood that each row is interchangeable with any other row, and likewise any column is interchangeable with any other column.

In addition, the H-matrix of the present invention may be implemented so that each subset M0–M5 is iterated no more than five times. For example, in the H-matrix depicted in FIG. 10, each of subsets M0, M1, M2, M3, M4 and M5 is iterated five times each on the left-hand side of the H-matrix before iterating matrices V0 and V1. Similarly, FIGS. 12 and 13 depict H-matrices comprising subsets M0, M1, M2, M3, M4 and M5 each iterated five times with matrices V0, V1 and V2 interposed between the subsets. As a result of the utilization of the modular structure described above, the H-matrix of the present invention becomes much easier to implement within its particular host computer system.

Figure 4:
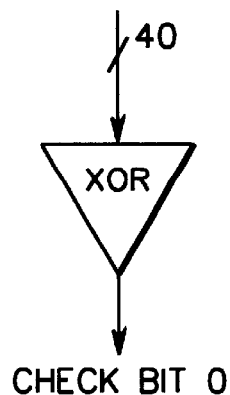
FIG. 4 depicts one example of a portion of the circuit of FIG. 3 used to generate a single check bit.

The H-matrix of FIG. 10, when expanded, has 146 columns and 12 rows. The first 134 columns (M0–M5 and V0 and V1) are designated as data columns and the last 12 columns (I12) are designated as ECC check columns. Furthermore, each row of the H-matrix is associated with and used to generate a single check bit. More specifically, each instance of a 1 in a row designates a data bit which is to be included in a specific group of data bits. This specific group of data bits, in turn, is used to generate a corresponding check bit. In particular, a check bit is generated by performing an exclusive OR (XOR) operation on each of the data bits of the data word as specified by the particular row of the H-matrix corresponding to that particular check bit. For example, FIG. 4 depicts a portion of a circuit used to generate check bit 0 and in this regard indicates that an XOR operation is performed on data bits 10, 12, 14, 16, 18, 20, 22, 24, 36, 38, 40, 42, 44, 46, 48, 50, 62, 64, 66, 68, 70, 72, 74, 76, 88, 90, 92, 94, 96, 98, 100, 102, 114, 116, 118, 120, 122, 124, 126 and 128. The result of this XOR operation represents check bit 0. Consistent with FIG. 4, an examination of row 0 of the H-matrix of FIG. 10, which corresponds to check bit 0, reveals that a 1 resides in each of columns 10, 12, 14, 16, 18, 20, 22, 24, 36, 38, 40, 42, 44, 46, 48, 50, 62, 64, 66, 68, 70, 72, 74, 76, 88, 90, 92, 94, 96, 98, 100, 102, 114, 116, 118, 120, 122, 124, 126 and 128. This procedure is then repeated with respect to each row of the H-matrix to generate a total of 12 check bits associated with the data word.

Figure 3:
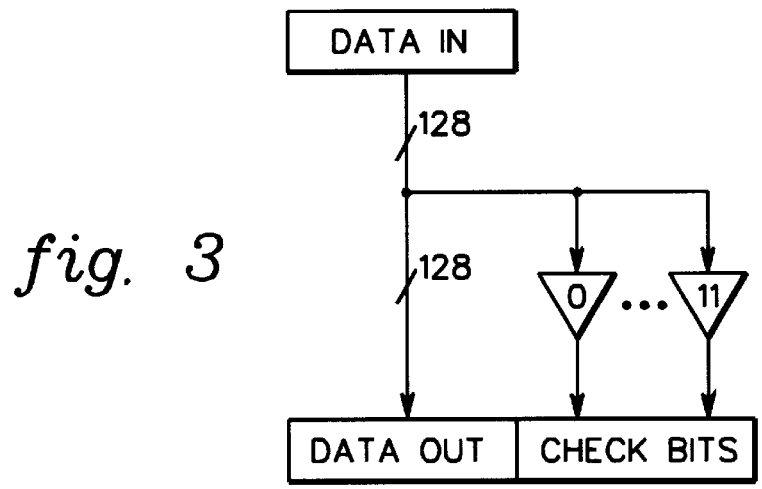
FIG. 3 depicts one example of a circuit used to generate a plurality of check bits associated with a data word in accordance with the present invention.

FIG. 3 depicts a partial circuit diagram of the check bit generation described above including the generation of each of check bits 0–11. In the embodiment depicted in FIG. 3, a 128 bit data word is written to memory together with 12 check bits generated in accordance with the principles of the present invention. As indicated above, each of the 12 check bits of FIG. 3 is generated by XORing a group of data bits selected according to the H-matrix. Subsequently, the 12 check bits, along with the 128 data bits are written to memory until a read operation is performed.

Figure 5:
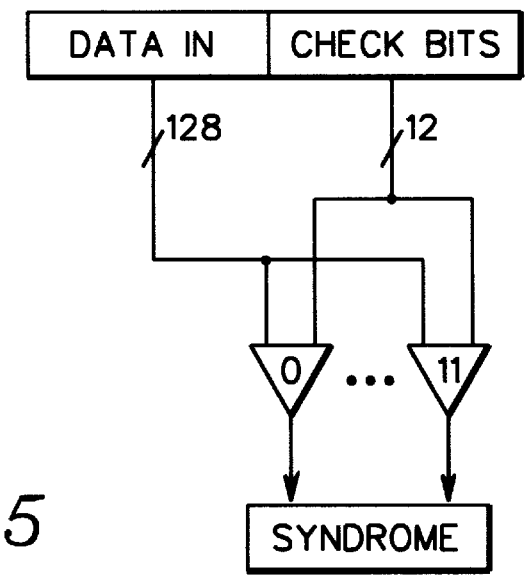
FIG. 5 depicts one example of a circuit used to generate a plurality of syndrome bits associated with the data word in accordance with the present invention.
Figure 6:
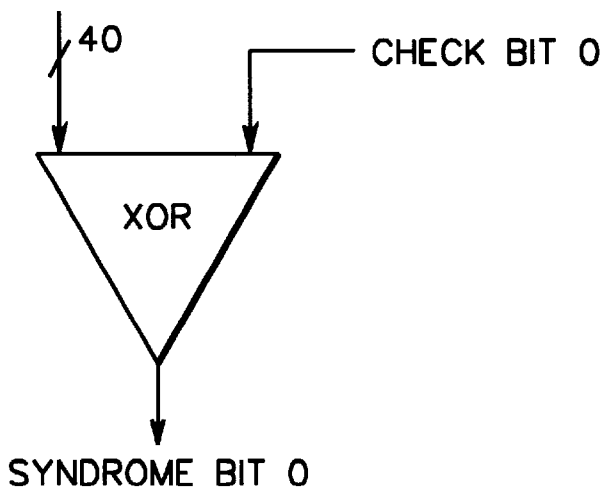
FIG. 6 depicts one example of a portion of the circuit of FIG. 5 used to generate a single syndrome bit.

Subsequent to the generation of the check bits and upon the occurrence of a read operation, a 12 bit syndrome is generated. As depicted in FIG. 5, when a read operation occurs, the 128 data bits together with the 12 associated check bits, previously written to memory as described above, are read from memory. After being read from memory, an XOR operation is again performed to generate the syndrome except that in this instance the XOR operation is performed on the group of data bits determined according to the H-matrix, as well as the corresponding check bit. Specifically, as shown in FIG. 6, an XOR operation is performed on data bits 10, 12, 14, 16, 18, 20, 22, 24, 36, 38, 40, 42, 44, 46, 48, 50, 62, 64, 66, 68, 70, 72, 74, 76, 88, 90, 92, 94, 96, 98, 100, 102, 114, 116, 118, 120, 122, 124, 126 and 128, as well as check bit 0. The result of this XOR operation represents syndrome bit 0. In addition, similar to the generation of the check bits, the data bits used in the XOR are determined according to the H-matrix. In other words, each of the data bits listed in FIG. 6 is shown as having a 1 in row 0 of the H-matrix of FIG. 10, and is also included in the group of data bits used to generate check bit 0 as described above. This procedure is then repeated with respect to each row of the H-matrix and with each corresponding check bit to generate a total of 12 syndrome bits associated with the data word.

Figure 7:
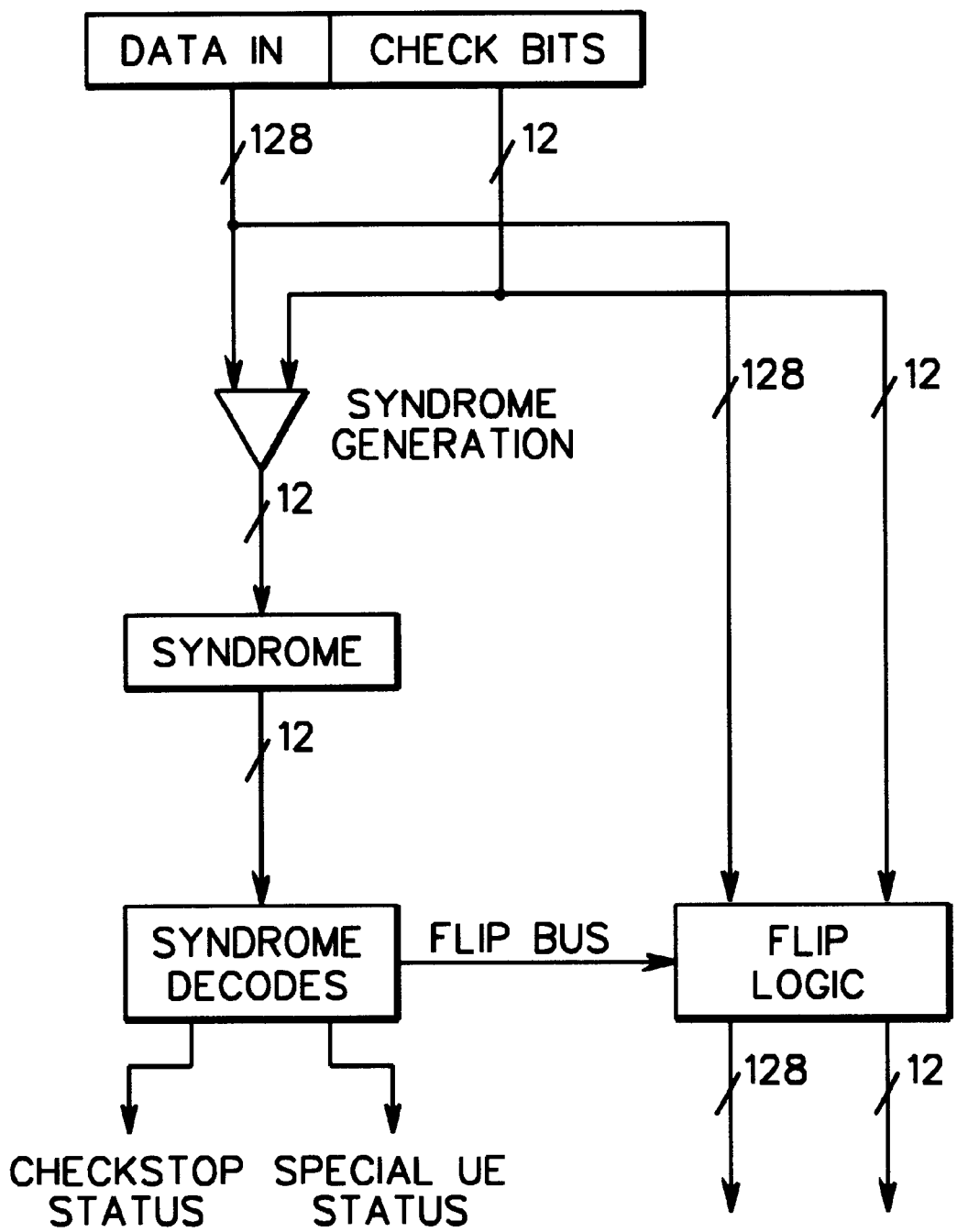
FIG. 7 depicts one example of a circuit used to decode the syndrome and correct any bits determined to be in error in accordance with the present invention.

After generation, as shown in FIG. 7, the syndrome is decoded to determine the presence of any erroneous data or check bits. In accordance with the principles of the invention, subsequent to syndrome decoding, any single error or double errors in a single symbol are corrected, as depicted in the FLIP LOGIC box of FIG. 7. Syndrome decoding is discussed below with reference to FIGS. 8 and 11, and error correction is discussed with reference to FIG. 9.

FIG. 11 depicts one embodiment of a syndrome decode table used to decode the syndrome generated above. Although alternate embodiments may exist, this particular decode table corresponds to the H-matrix of FIG. 10 and is comprised of a 12 row by 73 column table. Each of the 73 columns in turn, corresponds to a particular symbol or chip of the data word. For instance, column 0 corresponds to symbol 0, and likewise, column 11 corresponds to symbol 11. Furthermore, each column is comprised of 3 sub-columns, with the first sub-column corresponding to the first bit of the symbol to which the column corresponds, the second sub-column corresponding to the second bit of the symbol to which the column corresponds, and the third sub-column corresponding to both the first and the second bits of the symbol to which the column corresponds. For instance, the first sub-column of column 1 corresponds to the first bit of symbol 1, the second sub-column of column 1 corresponds to the second bit of symbol 1, and the third sub-column of column 1 corresponds to both the first and the second bit of symbol 1.

The first two sub-columns of each column of the decode table are determined according to the H-matrix. Specifically, the first two sub-columns of each column are identical to their corresponding columns of the H-matrix. For example, the first sub-column of column 0 of the decode table is equal to column 0 of the H-matrix. Similarly, the second sub-column of column 2 of the decode table is equal to column 5 of the H-matrix. The third sub-columns of decode table columns, on the other hand, are determined by XORing the first and second sub-column of the respective column. Thus, XORing the first and second sub-columns of row 0, column 0 (i.e., 0 and 0) results in the 0 residing in the third sub-column of row 0, column 0, and likewise XORing the first and second sub-columns of row 2, column 1 (i.e., 1 and 0) results in the 1 residing in the third sub-column of row 2, column 1.

As noted above, the decode table of FIG. 10 comprises 12 rows. Each of these rows, in turn, corresponds to one bit of the 12 bit syndrome. Thus in this embodiment, the top row of the decode table corresponds to syndrome bit 0, and similarly, the bottom row of the decode table corresponds to syndrome bit 11.

After generating the syndrome bits, the syndrome is compared against the individual syndrome patterns in the syndrome decode table to determine whether a bit in error exists, and, if an error exists, to determine the location of any single symbol errors (i.e., either one error or two errors located on a single symbol), or the existence of any multiple symbol errors (i.e., errors existing on more than one symbol). First, if each and every bit of the syndrome is zero, no error exists and the data word requires no modification. If, however, any bit of the syndrome is not zero, the syndrome must be compared with the sub-columns of the columns of the decode table to determine the location of single symbol errors or in the alternative to detect the presence of multiple symbol errors.

Figure 8:
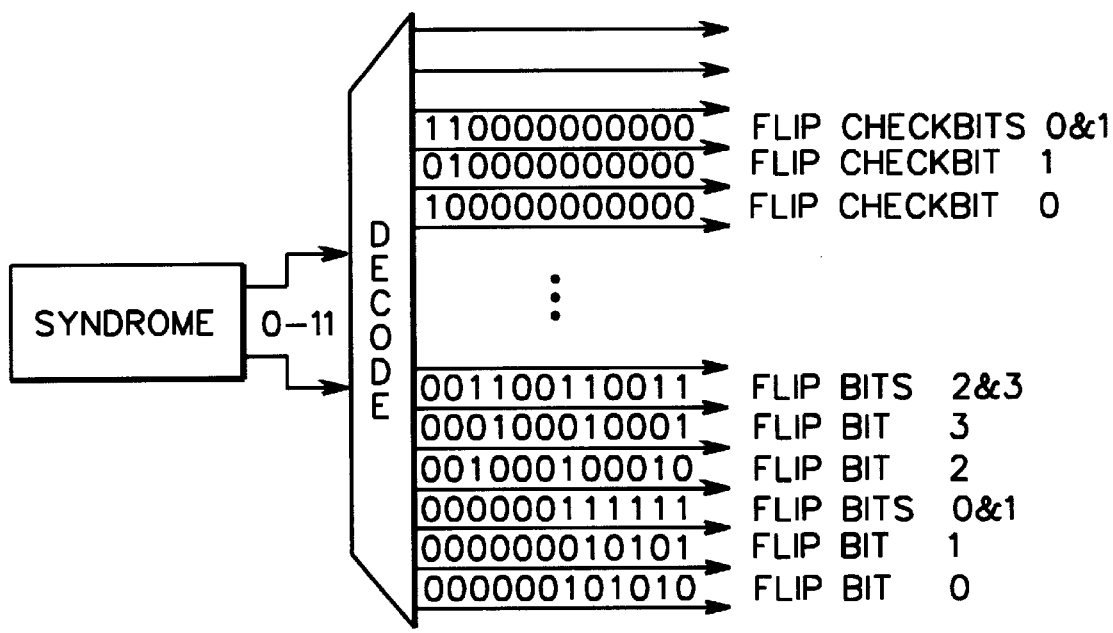
FIG. 8 depicts one example of a block diagram of the logic used to decode the syndrome of FIG. 5.

FIG. 8 depicts the logic used in determining the location of single symbol errors and the presence of multiple symbol errors. In this regard, each of the syndrome patterns shown in FIG. 8 corresponds to a sub-column of the decode table of FIG. 11, and as alluded to above, each sub-column indicates that either a single bit is in error, or that two bits in a single symbol are in error. To illustrate, sub-column 0 indicates that the first bit of symbol 0 is in error, sub-column 1 indicates that the second bit of symbol 0 is in error, and sub-column 3 indicates that both the first and the second bits of symbol 0 are in error. Accordingly, the generated syndrome may be compared against the syndrome patterns shown in FIG. 8 to determine the location of any single symbol errors. For instance, a generated syndrome of 000000101010 matches with the bottom syndrome pattern and indicates that the first bit of symbol 0, or in other words, bit 0 is in error. Similarly, a generated syndrome of 001100110011 matches with the sixth syndrome pattern from the bottom and indicates that both the first and the second bit of symbol 1, or in other words, bits 2 and 3 are in error. If, however, there are no matches between the generated syndrome and the sub-columns of the decode table and if all of the syndrome bits are not 0, then a multiple symbol error is determined to exist and an appropriate error message must be generated, as discussed in greater detail below.

Figure 9:
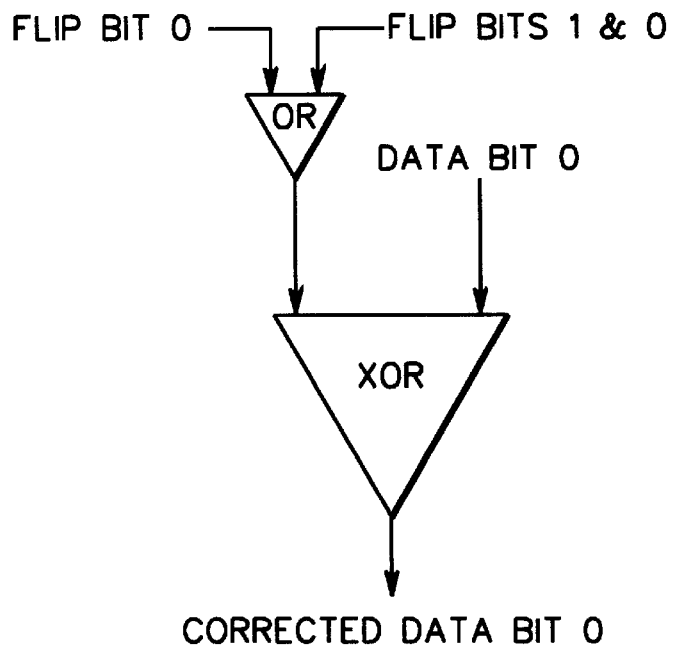
FIG. 9 depicts one example of a circuit used to correct a bit determined to be in error.

Subsequent to decoding the syndrome, uncorrectable error messages are generated in response to the detection of a multiple symbol error. Additionally, any single symbol errors are also corrected at this time. FIG. 9 depicts one embodiment of a circuit used to correct bits determined to be in error. More specifically, the inputs to the OR operation correspond to scenarios that affect the bit at issue. In this case, the bit at issue is bit 0 and the scenarios that affect bit 0 are if bit 0 is in error or if bits 0 and 1 are in error. Each of these inputs is set to 1 if the respective scenario is determined to exist by syndrome decoding as discussed above, otherwise the input is set to 0. Thus, in this example if bit 0 is determined to be in error, that particular input is set to 1. Subsequently, the OR of the two inputs is XORed with the data bit at issue to either correct an erroneous data bit, or leave unmodified a data bit determined to be correct. Hence, in this instance, the OR of the two inputs, or 1, is XORed with data bit 0 to complement data bit 0, thereby producing a corrected data bit 0.

In addition, as discussed above, the exact structure and format of the above ECCs depend on and vary with the bandwidth supported by the particular components implementing the ECCs. For instance, referring again to FIG. 1, data fetched out of memory 110 may be in the form of a 140 bit ECC word comprising 128 data bits and 12 check bits, generated according to, for example, the H-matrices of FIGS. 10 and 12–13, as described in detail above. In contrast, data fetched out of cache 130 may take the form of 72 bit ECC words comprising 64 data bits and 8 check bits for protection. An example of the latter ECC is described in detail in U.S. Pat. No. 5,774,481, and in Chen, C. L., and Hsiao, M. Y., Error-Correcting Codes for Semiconductor Memory Applications: A State-of-the-Art Review, 28 IBM Journal of Research and Development, 124 (March, 1984), each of which is incorporated herein by reference in its entirety. As the ECC words of memory 110 and cache 130 differ in size, ECC conversion is required in order to transmit data between the two. Examples of this conversion process are discussed in detail below.

Figure 14:
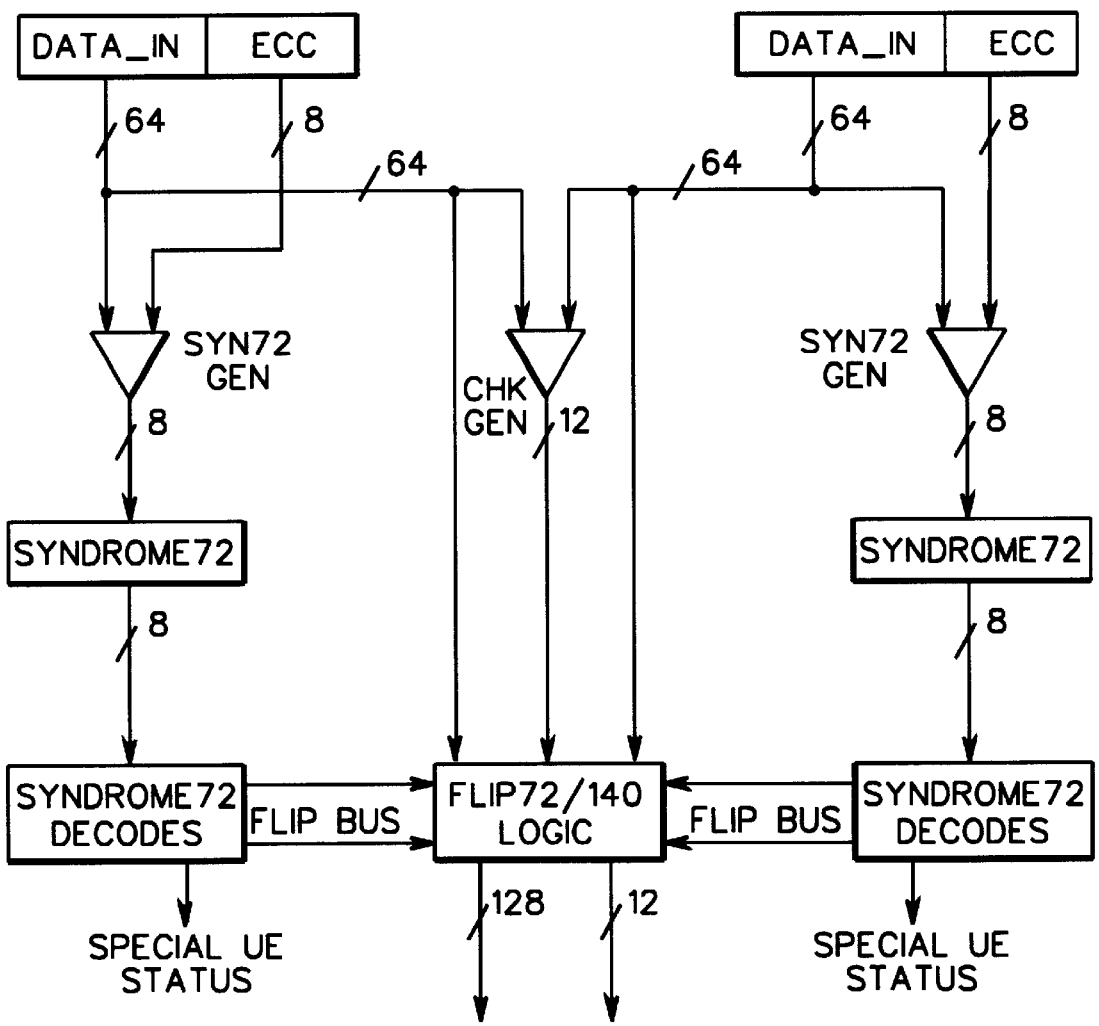
FIG. 14 depicts one example of a circuit used to protect data converted from two source error correction codes to a different destination error correction code.

FIG. 14 depicts one example of the conversion of two source 72 bit ECC words comprising 64 data bits and 8 check bits to a single destination 140 bit ECC word comprising 128 data bits and 12 check bits. In accordance with the principle of the present invention, generation of the 12 destination check bits commences before error detection occurs in the two source ECC words. More particularly, as shown in FIG. 14, the 64 data bits of each source 72 bit ECC word are combined, for example by concatenating the two sets of data bits to form a single 128 data bit word (which may or may not contain errors). This 128 data bit word is then protected with 12 check bits generated by utilizing, for instance, the ECC protection scheme described above and as shown in FIGS. 3–4.

As this check bit generation takes place, the two source 72 bit words are checked for errors. Briefly summarized, this process involves the generation of a syndrome from each of the source ECC words followed by decoding of the syndromes. As mentioned above, an example of such process is described in U.S. Pat. No. 5,774,481 and in Chen, C. L., and Hsiao, M. Y., Error-Correcting Codes for Semiconductor Memory Applications: A State-of-the-Art Review, 28 IBM Journal of Research and Development, 124 (March, 1984), is thus not discussed again here.

Any errors detected in the source data (i.e., collectively the 64 data bits from each of the two source ECC words), are subsequently corrected in the destination ECC word. Moreover, by commencing generation of the destination check bits prior to error detection in the source words, protection is imparted throughout the conversion process. Furthermore, by generating the destination check bits in parallel to and concurrently with error detection, a substantial time savings is realized over systems utilizing serial processes.

Figure 16:
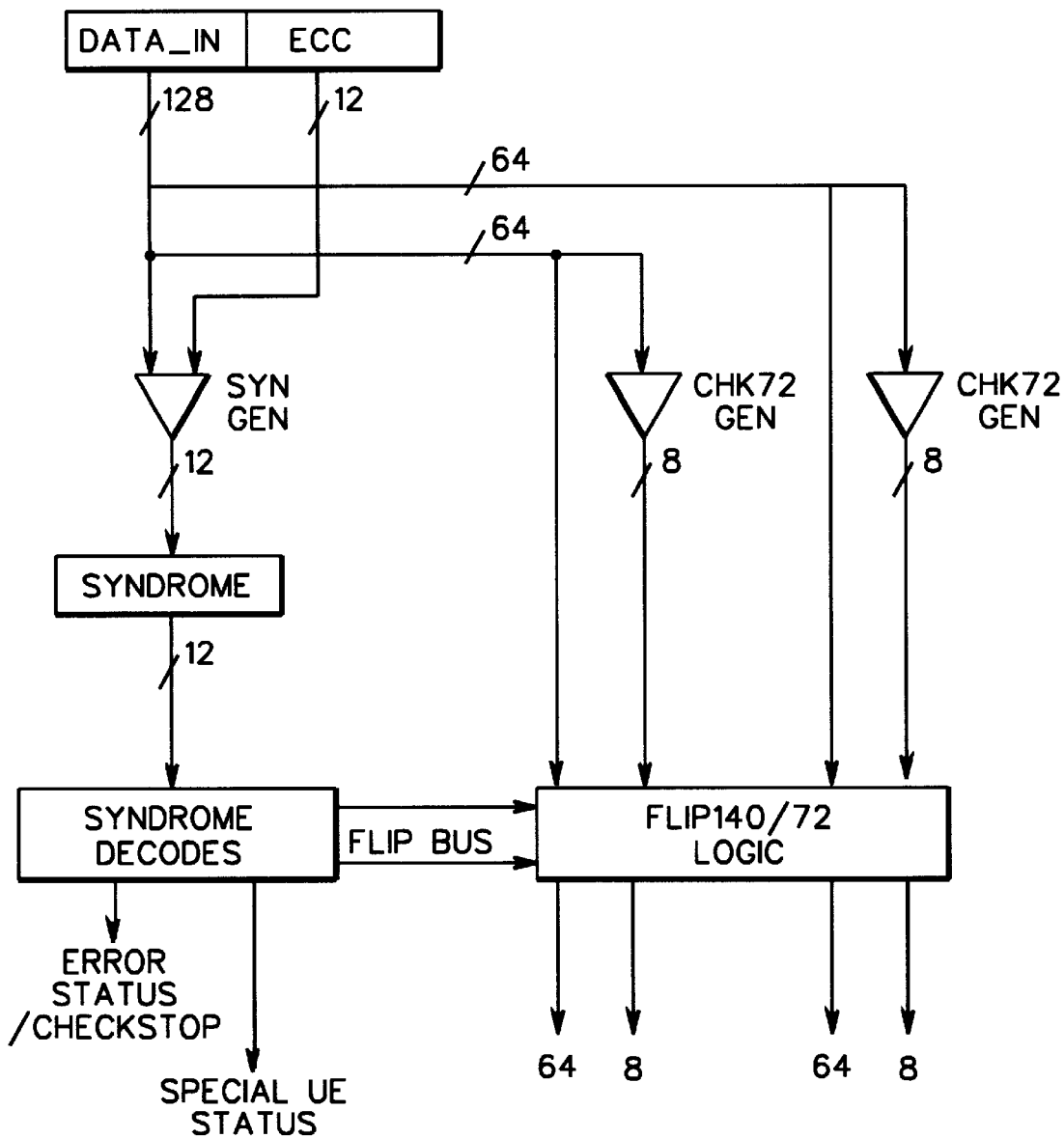
FIG. 16 depicts one example of a circuit used to protect data converted from one source error correction code to two differing destination error correction codes.

Similar to the example depicted in FIG. 14, FIG. 16 depicts an example of a conversion process from a single source 140 bit ECC word comprising 128 data bits and 12 check bits to two destination 72 bit ECC words with each comprising 64 data bits and 8 check bits. In accordance with the principle of the present invention, generation of the two sets of 8 destination check bits commences before error detection occurs in the single source ECC word. As shown in FIG. 16, the 128 data bits of the source ECC word are separated into two sets of data bits to form two 64 bit data words (which like the previous example may or may not contain errors). These two 64 bit data words are then each protected with 8 check bits generated by utilizing, for instance, the ECC protection scheme described in U.S. Pat. No. 5,774,481 and in Chen, C. L., and Hsiao, M. Y., Error-Correcting Codes for Semiconductor Memory Applications: A State-of-the-Art Review, 28 IBM Journal of Research and Development, 124 (March, 1984), or the like.

As check bit generation takes place in FIG. 16, the single source word is checked for errors. This process involves the generation of a syndrome from the data and check bits of the source ECC word followed by decoding of the syndromes, as described above and as shown in FIGS. 5–8.

In accordance with the principles of the present invention, in addition to correcting any erroneous data bits of the destination word(s), the check bits of the destination word(s) affected by the erroneous data bits are also corrected. Furthermore, instead of regenerating each and every one of the check bits of the data word, an additional time savings may be realized by reducing or eliminating unnecessary logic. Thus, instead of performing an exclusive OR function on each data bit used in generating a particular check bit, as in FIG. 4, only certain of the data bits need be considered. Several of these examples are discussed below with reference to FIGS. 15, 17, 18 and 19.

Figure 15:
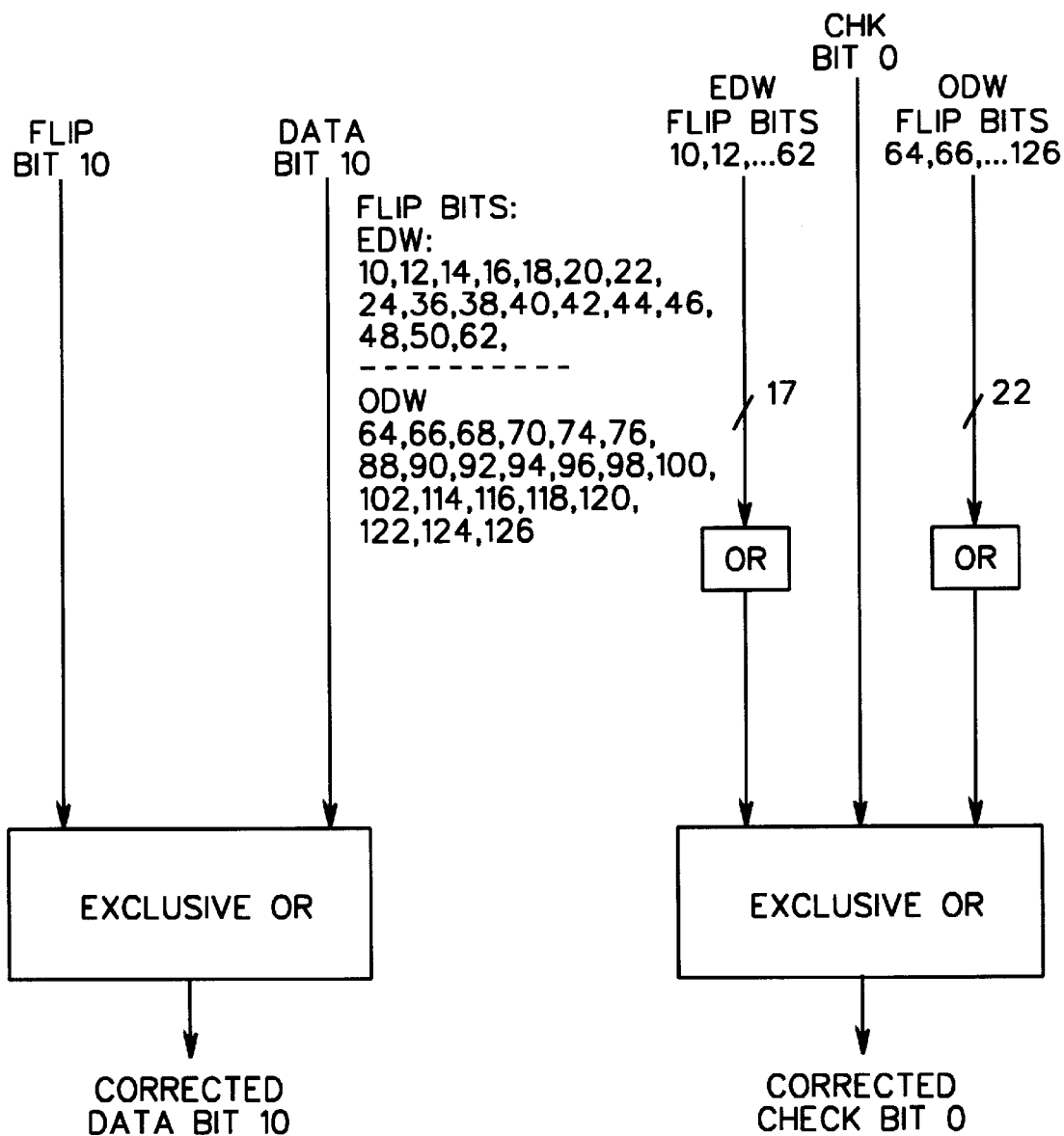
FIG. 15 depicts one example of a circuit used to correct a data bit and a check bit during conversion, in accordance with the principles of the present invention.

In accordance with the principles of the present invention, one example of a process used to correct a data bit and one associated check bit in a destination word is shown in FIG. 15. In this example, two 72 bit ECC words are being converted into a single 140 bit ECC word and data bit 10 has been determined to be in error in a manner similar to that shown in FIG. 8 or the like. For example, referring back to FIG. 8, each syndrome pattern or decode (e.g., 000000101010) indicates that one or more data bits are in error. Additionally, each detection of an error, in turn, activates one or more flip bit. Furthermore, each active flip bit corresponds to one erroneous data bit. Hence, in this example data bit 10 is determined to be in error and therefore flip bit 10 gets activated. Similarly, a syndrome pattern or decode may indicate that both bits 0 and 1 are in error, in which case flip bits 0 and 1 get activated.

As shown in FIG. 15, to correct data bit 10, it is simply XORed with flip bit 10. On the other hand, each of the check bits affected by data bit 10 are corrected by first performing an OR function on certain groups of the flip bits. The results of these OR functions are then XORed with the check bits to result in corrected check bits. More specifically, in the example of FIG. 15 the flip bits are grouped into several flip groups such that no more than one flip bit may be active in each group—a determination which depends on the structure of the particular ECC scheme involved. For instance, using the ECC scheme of U.S. Pat. No. 5,774,481 and in Chen, C. L., and Hsiao, M. Y., Error-Correcting Codes for Semiconductor Memory Applications: A State-of-the-Art Review, 28 IBM Journal of Research and Development, 124 (March, 1984), as an example, each 72 bit data word may contain no more than one single bit correctable error. Thus, each of the two data words comprises its own individual flip group, in this case, an even data word (EDW) and an odd data word (ODW).

Subsequently, the flip bits in a flip group which affect the erroneous check bit at issue (determined according to the H-matrix of the ECC scheme, e.g., FIG. 10) are included in an OR operation. (It should be noted that because no more than one of its inputs can be active, an XOR could just as easily be implemented in place of the OR function. However, the OR is utilized because of its relative speed advantage.) In this example, flip bits 10, 5 12, 14, 16, 18, 20, 22, 24, 36, 38, 40, 42, 44, 46, 48, 50 and 62 correspond to the data bits used to generate check bit 0 of the destination data word (as indicated in the H-matrix of FIG. 10) and, because no more than a single one of these flip bits may be active, are included in their own flip group. Furthermore, flip bits 64, 66, 68, 70, 72, 74, 76, 88, 90, 92, 94, 96, 98, 100, 102, 114, 116, 118, 120, 122, 124 and 126 also affect check bit 0 of the destination data word. However, these flip bits correspond to the odd data word and are thus included in their own flip group. (As a further note, in this example, as the two sets of data bits of the source data words are concatenated thus, flip bits 64, 66, 68, 70, 72, 74, 76, 88, 90, 92, 94, 96, 98, 100, 102, 114, 116, 118, 120, 122, 124 and 126 correspond to bits 0, 2, 4, 6, 8, 10, 12, 24, 26, 28, 30, 32, 34, 36, 38, 50, 52, 54, 56, 58, 60 and 62 of the second source data word.) Subsequently, the results of these OR functions are XORed along with the affected check bit to result in the corrected check bit.

Figure 17:
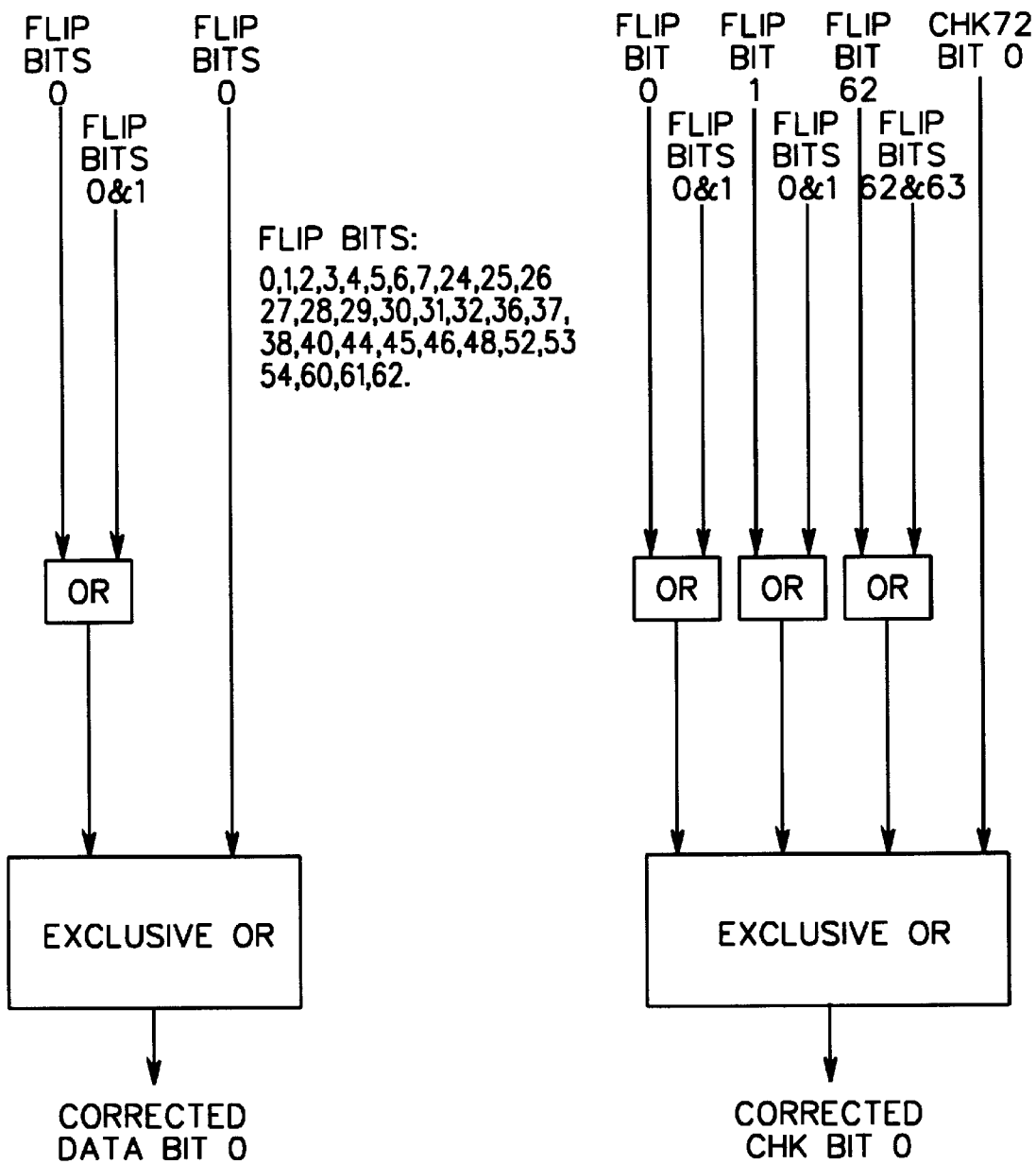
FIGS. 17–19 depict various examples of circuits used to correct data bits and check bits during error correction code conversion, in accordance with the principles of the present invention.

FIG. 17 depicts an example of a process used to correct a data bit and one associated check bit where a single 140 bit ECC word is being converted into two 72 bit ECC words. In this example, as discussed above, the data bits of the source ECC word are grouped into multiple bit symbols (e.g., two) such that correctable errors occur on no more than the data bit(s) of a single symbol. To correct an erroneous data bit, the data bit is XORed with the result of an OR function performed on each of the decodes affecting that data bit. Thus, in this example, since flip bits 0 and 0 & 1, respectively indicating that data bit 0 and data bits 0 & 1 are in error, both correspond to data bit 0, an OR function is performed on the two with the result being XORed with the data bit itself.

To correct the check bits affected by erroneous data bits, an OR function is performed on the decodes which include flip bits corresponding to the data bits which, in turn, are used to generate the erroneous check bit, as determined by an H-matrix. Thus in FIG. 17, data bits 0, 1, 2, 3, 4, 5, 6, 7, 24, 25, 26, 27, 28, 29, 30, 31, 32, 36, 37, 38, 40, 44, 45, 46, 48, 52, 53, 54, 60, 61 and 62 are used in generating check bit 0 (as determined according to an H-matrix). As a result, each decode having a flip bit which may be activated by one of these data bits is grouped together according to that flip bit. Returning to FIG. 17, either flip bit 0 or flip bits 0 & 1 may be activated when data bit 0 is in error, so the results of these two decodes (i.e., these decode results) are grouped together and an OR is performed thereon. This is repeated for each of the groups and subsequently all of the results are XORed with the check bit to produce the corrected check bit.

Figure 18:
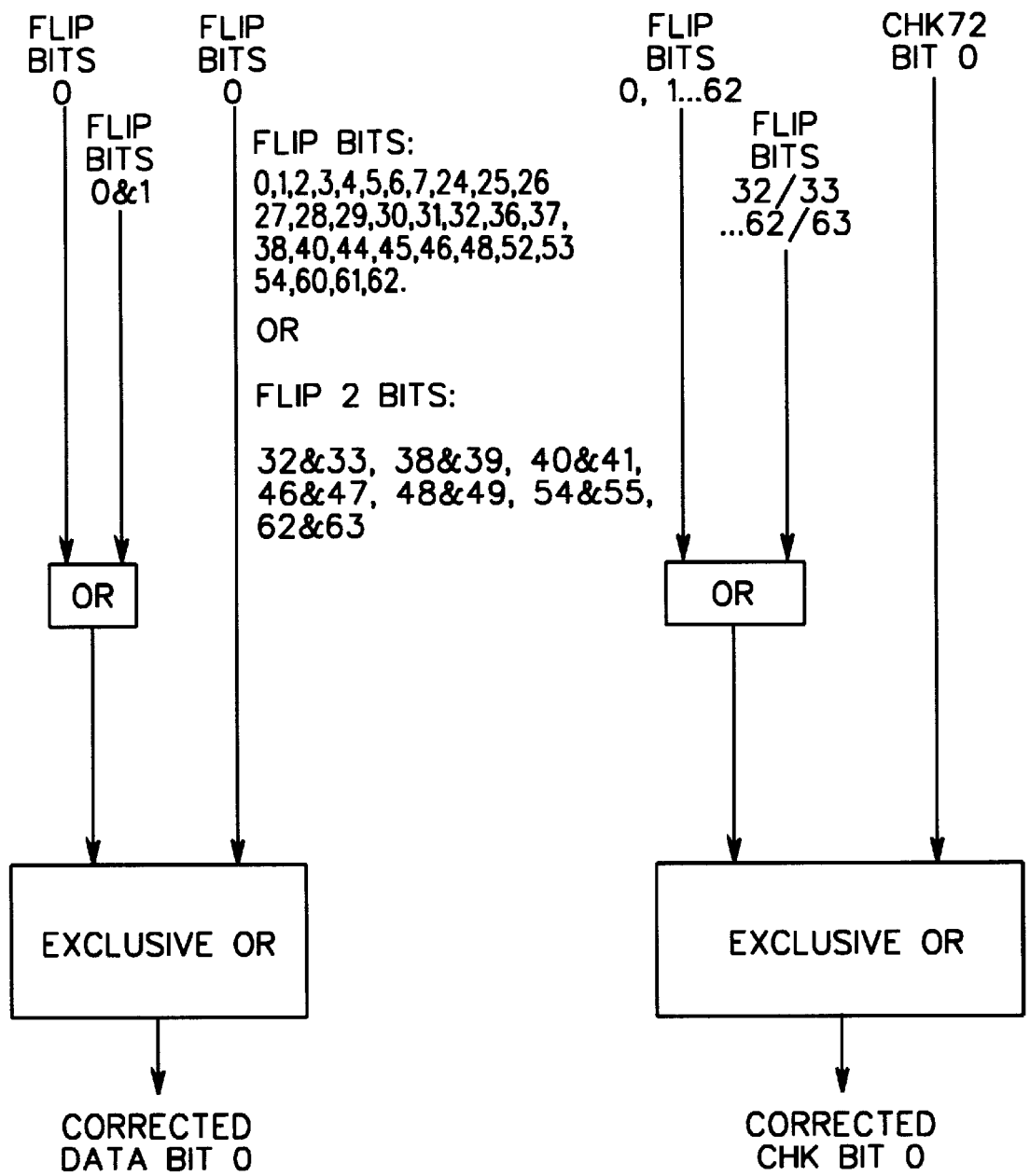
Figure 19:
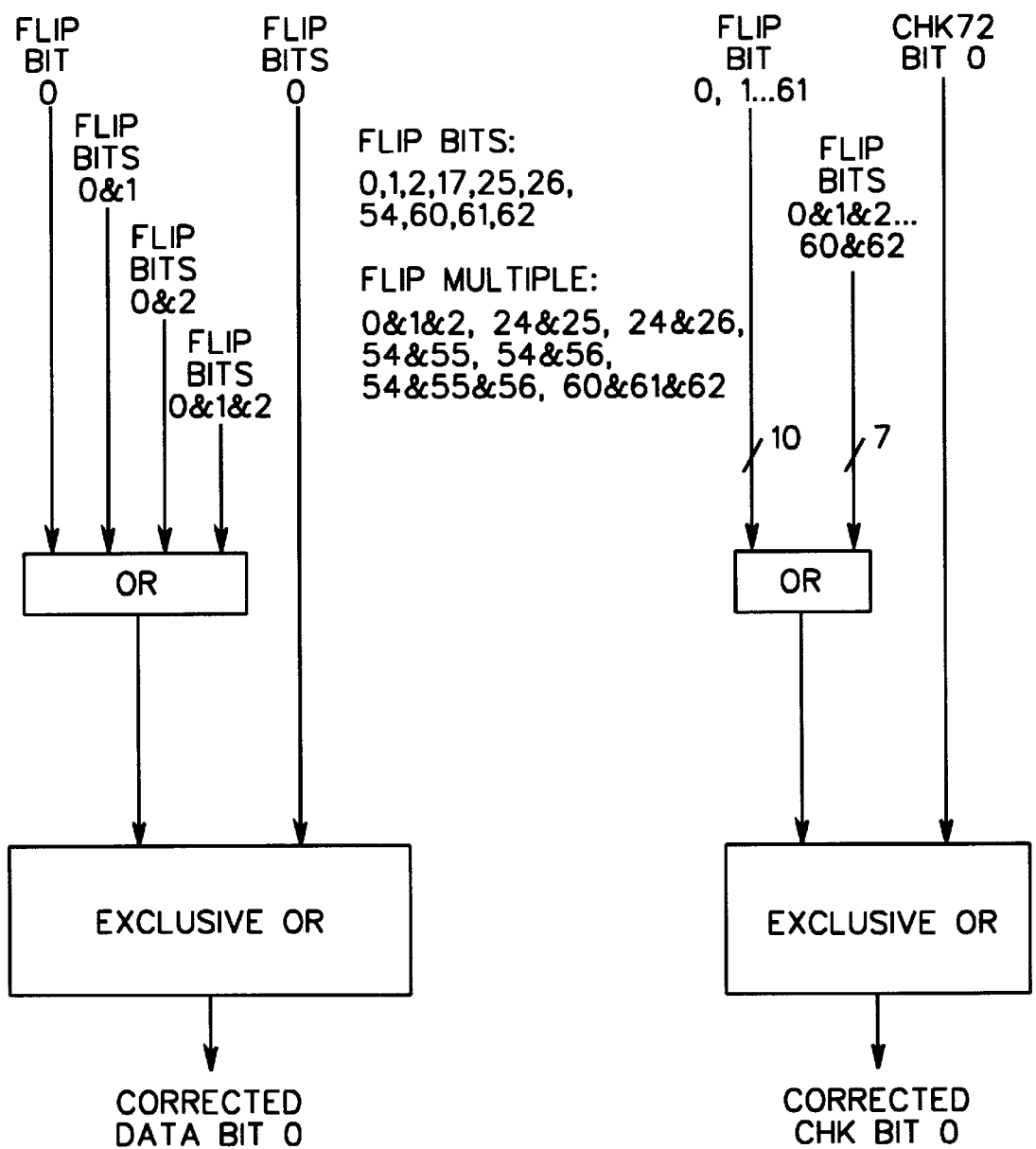

FIGS. 18–19 depict other examples of a process used to correct a data bit and one associated check bit where a single 140 bit ECC word is being converted into two 72 bit ECC words. In these examples, the data bits of the source ECC word are grouped into two and three bit symbols such that correctable errors occur on no more than the data bit(s) of a single symbol. The erroneous data bit, in these examples are corrected in a manner similar to that in FIG. 17 and hence is not discussed again.

To correct the check bits, the corresponding data bits of all possible decode results (i.e., to illustrate using two bit symbols, each decode result indicates the data bits in error on a symbol, since no more than the bits on a single symbol may be in error in this particular example, the group of all possible decode results would consist of the following possibilities for each symbol in the data word: (1) bit one of the symbol is in error; (2) bit two of the symbol is in error; and (3) both bits of the symbol are in error) are intersected with a set of data bits corresponding to the erroneous check bit (i.e., the data bits used to generate that particular check bit). The result of such intersections will be numerous subsets with each subset containing an even or odd number of elements. Each of these decode results having an odd number of elements is then included in an OR function. Subsequently, the result of this OR function is XORed with the check bit itself to produce a corrected check bit.

To illustrate using a two bit symbol as an example, in FIG. 18 assume that check bit 0 is at issue. Then an intersection of a possible decode result of bit 1 of symbol 0 (or bit 0) and a set of data bits corresponding to check bit 0 (i.e., 0, 1, 2, 3, 4, 5, 6, 7, 24, 25, 26, 27, 28, 29, 30, 31, 32, 36, 37, 38, 40, 44, 45, 46, 48, 52, 53, 54, 60, 61 and 62) produces a subset having one element {0}. Thus, because there are an odd number of elements, this result would be fed into the OR function. A next possible decode result of bits 1 and 2 of symbol 0 (or bits 0 and 1) when intersected with the set of data bits corresponding to check bit 0 would produce a subset having two elements {0,1} and thus, because there are an even number of elements, this result would not be fed into the OR function. The possible decode result of bits 1 and 2 of symbol 16 (bits 32 and 33) when intersected produces a subset having one element {32}, and thus, because there are an odd number of elements, this result is also fed into the OR function. This procedure is repeated for each possible decode result to determine all of the inputs to the OR function, which result in turn, is XORed with the check bit at issue.

To illustrate the correction of a check bit in a three bit symbol example, reference is made to FIG. 19. In this example, an intersection of a possible decode result of bit 1 of symbol 0 (or bit 0) and a set of data bits corresponding to check bit 0 (i.e., 0, 1, 2, 17, 25, 26, 54, 60, 61 and 62) produces a subset having one element {0}. Thus, because there are an odd number of elements, this result would be fed into the OR function. A next possible decode result of bits 1 and 2 of symbol 0 (or bits 0 and 1) when intersected with the set of data bits corresponding to check bit 0 would produce a subset having two elements {0,1} and thus, because there are an even number of elements, this result would not be fed into the OR function. The possible decode result of bits 1, 2 and 3 of symbol 0 (bits 0, 1 and 2) when intersected produces a subset having three intersections {0,1,2}, and thus, because there are an odd number of elements, this result is also fed into the OR function. This procedure is repeated for each possible decode result to determine all of the inputs to the OR function, which result in turn, is XORed with the check bit at issue.

By using the above described procedure, correction of errors in the destination word can be accomplished by using less than all of the possible decodes. In this manner, unnecessary logic may be avoided thereby realizing a savings in time. In addition, using OR logic instead of XOR logic, when available, further increases the time savings that may be realized.

Described in detail above are the computer system and logic used in one embodiment of the present invention to implement a data protection capability for protecting data during conversion between different error correction codes. As described herein, the check bits of the destination ECC are generated prior to error detection and any correction in the source ECC. Then, errors detected in the source ECC are corrected in the destination ECC. This generation of a destination ECC in parallel with the identification of errors in the source ECC results not only in an overlap in protection but also reduces the amount of time needed for conversion. In addition, various logic reduction techniques may be implemented, for instance, by complementing less than all of the data bits indicated as being in error by the active flip bits or by the decodes, to further reduce the amount of time required during conversion.

Furthermore, it should be noted that the specific OR or XOR operations described in the embodiments above are utilized for exemplary reasons only, and that the present invention is not to be construed as being limited to only those specific operations. To the contrary, other operations, for example the complements of the OR and XOR operations, may just as easily be implemented without departing from the principles of the instant invention.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are merely exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of protecting data during conversion from a source error correction code to a destination error correction code, wherein said source error correction code and said destination error correction code both comprise a set of data bits representing said data, said source error correction code supporting correction of multiple data errors, and wherein said destination error correction code further comprises a plurality of destination check bits to be generated from said set of data bits during conversion for protecting said data after conversion, said method comprising:

generating, during conversion from said source error correction code to said destination error correction code, said plurality of destination check bits prior to a detection for errors in said source error correction code to ensure that said data bits are protected throughout said conversion;

detecting any errors in said source error correction code;

correcting said errors in said source error correction code; and correcting each destination check bit using said detecting of errors in said source error correction code, wherein multiple errors in said source error correction code that do not effect the destination check bit being corrected are not used for correction of the destination check bit.

2. The method of claim 1, wherein said detecting for errors comprises generating a syndrome from data bits of said source error correction code and subsequently decoding said syndrome, and said generating said plurality of destination check bits comprises determining values of said data bits used in generating said plurality of destination check bits prior to generating and decoding said syndrome.

3. The method of claim 1, wherein said correcting comprises complementing at least one erroneous data bit and at least one erroneous destination check bit corresponding thereto.

4. The method of claim 3, wherein detection of an erroneous data bit activates a corresponding flip bit, and said complementing said at least one erroneous destination check bit comprises performing an OR function on one or more flip bits, and performing an exclusive OR function on a result of said OR function and said erroneous destination check bit.

5. The method of claim 1, wherein said detecting comprises generating at least one decoded syndrome value of a plurality of decoded syndrome values such that each decoded syndrome value has a result which indicates a set of data bits in error.

6. The method of claim 5, wherein said correcting comprises, for each erroneous destination check bit, performing an OR function, for each data bit corresponding to said erroneous check bit, on said decoded syndrome values corresponding to said data bit, and performing an exclusive OR function on said erroneous destination check bit and the results of said OR functions.

7. The method of claim 5, wherein an intersection of said set of data bits in error for each of all possible decoded syndrome value results and a set of data bits corresponding to an erroneous check bit produces subsets containing even and odd numbers of elements, and wherein said correcting comprises, for each erroneous destination check bit, performing an OR function on said decoded syndrome value results whose intersecting results in a subset containing an odd number of elements, and performing an exclusive OR function on the result of said OR function and said erroneous destination check bit.

8. The method of claim 5, wherein said correcting said errors comprises complementing less than all of said data bits indicated as being in error by said decoded syndrome values.

9. The method of claim 1, wherein said source error correction code is generated when fetched from one of a main memory and a cache and is converted into said destination error correction code when stored to the other of said main memory and said cache.

10. The method of claim 1, wherein said generating said plurality of destination check bits is performed in parallel with a detection for errors in said source error correction code.

11. The method of claim 1, wherein errors in said data are detected in said source error correction code but are corrected in said destination error correction code after generation thereof.

12. The method of claim 1, wherein conversion from said source error correction code to said destination error correction code commences before errors in said data are detected to allow said destination error correction code to be generated concurrently with error detection in said source error correction code, and subsequently correcting errors detected in said source error correction code in said destination error correction code.

13. A system for protecting data during conversion from a source error correction code to a destination error correction code, wherein said source error correction code and said destination error correction code both comprise a set of data bits representing said data, said source error correction code supporting correction of multiple data errors, and wherein said destination error correction code further comprises a plurality of destination check bits to be generated from said set of data bits during conversion for protecting said data after conversion, said system comprising:

means for generating, during conversion from said source error correction code to said destination error correction code, said plurality of destination check bits prior to a detection for errors in said source error correction code to ensure that said data bits are protected throughout said conversion;

means for detecting any errors in said source error correction code;

means for correcting said errors in said source error correction code; and means for correcting each destination check bit using said detecting of errors in said source error correction code, wherein multiple errors in said source error correction code that do not effect the destination check bit being corrected are not used for correction of the destination check bit.

14. The system of claim 13, wherein said means for detecting errors comprises means for generating a syndrome from data bits of said source error correction code and for subsequently decoding said syndrome, and said means for generating said plurality of destination check bits comprises means for determining values of said data bits used in generating said plurality of destination check bits prior to generating and decoding said syndrome.

15. The system of claim 13, wherein said means for correcting comprises means for complementing at least one erroneous data bit and at least one erroneous destination check bit corresponding thereto.

16. The system of claim 15, wherein detection of an erroneous data bit activates a corresponding flip bit, and said means for complementing said at least one erroneous destination check bit comprises means for performing an OR function on one or more flip bits, and means for performing an exclusive OR function on a result of said OR function and said erroneous destination check bit.

17. The system of claim 13, wherein said means for detecting comprises means for generating at least one decoded syndrome value of a plurality of decoded syndrome values such that each decoded syndrome value has a result which indicates a set of data bits in error.

18. The system of claim 17, wherein said means for correcting comprises, for each erroneous destination check bit, means for performing an OR function, for each data bit corresponding to said erroneous check bit, on said decoded syndrome values corresponding to said data bit, and means for performing an exclusive OR function on said erroneous destination check bit and the results of said OR functions.

19. The system of claim 17, wherein an intersection of said set of data bits in error for each of all possible decoded syndrome value results and a set of data bits corresponding to an erroneous check bit produces subsets containing even and odd numbers of elements, and wherein said means for correcting comprises, for each erroneous destination check bit, means for performing an OR function on said decoded syndrome value results whose intersecting results in a subset containing an odd number of elements, and means for performing an exclusive OR function on the result of said OR function and said erroneous destination check bit.

20. The system of claim 17, wherein said means for correcting said errors comprises means for complementing less than all of said data bits indicated as being in error by said decoded syndrome values.

21. The system of claim 13, wherein said source error correction code is generated when fetched from one of a main memory and a cache and is converted into said destination error correction code when stored to the other of said main memory and said cache.

22. The system of claim 13, wherein said means for generating said plurality of destination check bits generates in parallel with a detection for errors in said source error correction code.

23. The system of claim 13, wherein errors in said data are detected in said source error correction code but are corrected in said destination error correction code after generation thereof.

24. The system of claim 13, wherein conversion from said source error correction code to said destination error correction code commences before errors in said data are detected to allow said destination error correction code to be generated concurrently with error detection in said source error correction code, and subsequently correcting errors detected in said source error correction code in said destination error correction code.

25. A system for protecting data during conversion from a source error correction code to a destination error correction code, wherein said source error correction code and said destination error correction code both comprise a set of data bits representing said data, said source error correction code supporting correction of multiple data errors, and wherein said destination error correction code further comprises a plurality of destination check bits to be generated from said set of data bits during conversion for protecting said data after conversion, said system comprising:

a computing component adapted to generating, during conversion from said source error correction code to said destination error correction code, said plurality of destination check bits prior to a detection for errors in said source error correction code to ensure that said data bits are protected throughout said conversion;

said component further being adapted to detecting any errors in said source error correction code;

said component further being adapted to correcting said errors in said source error correction code; and said component also being adapted to correcting each destination check bit using said detecting of errors in said error correction code, wherein multiple errors in said source error correction code that do not effect the destination check bit being corrected are not used for correction of the destination check bit.

26. An article of manufacture comprising:

a computer useable medium having computer readable code means embodied thereon for protecting data during conversion from a source error correction code to a destination error correction code, wherein said source error correction code and said destination error correction code both comprise a set of data bits representing said data, said source error correction code supporting correction of multiple data errors, and wherein said destination error correction code further comprises a plurality of destination check bits to be generated from said set of data bits during conversion for protecting said data after conversion, the computer readable program code means in said article of manufacture comprising:

computer readable program code means for generating, during conversion from said source error correction code to said destination error correction code, said plurality of destination check bits prior to a detection for errors in said source error correction code to ensure that said data bits are protected throughout said conversion;

computer readable program code means for detecting any errors in said source error correction code;

computer readable program code means for correcting said errors in said source error correction code; and computer readable program code means for correcting each destination check bit using said detecting of errors in said source error correction code, wherein multiple errors in said source error correction code that do not effect the destination check bit being corrected are not used for correction of the destination check bit.

27. The article of manufacture of claim 26, wherein said computer readable program code means for detecting for errors comprises computer readable program code means for generating a syndrome from data bits of said source error correction code and subsequently decoding said syndrome, and said computer readable program code means for generating said plurality of destination check bits comprises computer readable program code means for determining values of said data bits used in generating said plurality of destination check bits prior to generating and decoding said syndrome.

28. The article of manufacture of claim 26, wherein said computer readable program code means for correcting comprises computer readable program code means for complementing at least one erroneous data bit and at least one erroneous destination check bit corresponding thereto.

29. The article of manufacture of claim 28, wherein detection of an erroneous data bit activates a corresponding flip bit, and said computer readable program code means for complementing said at least one erroneous destination check bit comprises computer readable program code means for performing an OR function on one or more flip bits, and computer readable program code means for performing an exclusive OR function on a result of said OR function and said erroneous destination check bit.

30. The article of manufacture of claim 26, wherein said computer readable program code means for detecting comprises computer readable program code means for generating at least one decoded syndrome value of a plurality of decoded syndrome values such that each decoded syndrome value has a result which indicates a set of data bits in error.

31. The article of manufacture of claim 30, wherein said computer readable program code means for correcting comprises, for each erroneous destination check bit, computer readable program code means for performing an OR function, for each data bit corresponding to said erroneous check bit, on said decoded syndrome values corresponding to said data bit, and computer readable program code means for performing an exclusive OR function on said erroneous destination check bit and the results of said OR functions.

32. The article of manufacture of claim 30, wherein an intersection of said set of data bits in error for each of all possible decoded syndrome value results and a set of data bits corresponding to an erroneous check bit produces subsets containing even and odd numbers of elements, and wherein said computer readable program code means for correcting comprises, for each erroneous destination check bit, computer readable program code means for performing an OR function on said decoded syndrome value results whose intersecting results in a subset containing an odd number of elements, and computer readable program code means for performing an exclusive OR function on the result of said OR function and said erroneous destination check bit.

33. The article of manufacture of claim 30, wherein said computer readable program code means for correcting said errors comprises computer readable program code means for complementing less than all of said data bits indicated as being in error by said decoded syndrome values.

34. The article of manufacture of claim 26, wherein said source error correction code is generated when fetched from one of a main memory and a cache and is converted into said destination error correction code when stored to the other of said main memory and said cache.

35. The article of manufacture of claim 26, wherein said computer readable program code means for generating said plurality of destination check bits generates in parallel with a detection for errors in said source error correction code.

36. The article of manufacture of claim 26, wherein errors in said data are detected in said source error correction code but are corrected in said destination error correction code after generation thereof.

37. The article of manufacture of claim 26, wherein conversion from said source error correction code to said destination error correction code commences before errors in said data are detected to allow said destination error correction code to be generated concurrently with error detection in said source error correction code, and subsequently correcting errors detected in said source error correction code in said destination error correction code.

38. A method of protecting data during conversion from multiple source error correction codes to at least one destination error correction code, wherein said multiple source error correction codes and said at least one destination error correction code both comprise a set of data bits representing said data, and wherein said at least one destination error correction code further comprises a plurality of destination check bits to be generated from said set of data bits during conversion for protecting said data after conversion, said method comprising:

generating, during conversion from said multiple source error correction codes to said at least one destination error correction code, said plurality of destination check bits prior to a detection for errors in said multiple source error correction codes to ensure that said data bits are protected throughout said conversion;

detecting at least one data bit error in at least two of said multiple source error correction codes;

correcting said data bit errors; and correcting each of said destination check bits only if an odd number of said data bits in error were used for said generating of said destination check bit.

39. The method of claim 38, further comprising activating a flip bit of a plurality of flip bits upon detection of an erroneous data bit, wherein each said flip bit corresponds to one data bit and, when active, indicates that said one data bit is in error.

40. The method of claim 39, wherein said flip bits are grouped into one of at least one flip group such that no more than one flip bit may be active in a single flip group, said flip groups being further divided into multiple subgroups with each subgroup affecting a single destination check bit according to an H-matrix wherein said correcting comprises, for each erroneous destination check bit, performing an OR function on said flip bits in each subgroup affecting said erroneous destination check bit, and performing an exclusive OR function on said erroneous destination check bit and the results of said OR functions performed on said flip bits in said subgroup.

41. The method of claim 39, wherein said correcting said errors comprises complementing less than all of said data bits indicated as being in error by said active flip bits.

42. A system of protecting data during conversion from multiple source error correction codes to at least one destination error correction code, wherein said multiple source error correction codes and said at least one destination error correction code both comprise a set of data bits representing said data, and wherein said at least one destination error correction code further comprises a plurality of destination check bits to be generated from said set of data bits during conversion for protecting said data after conversion, said system comprising:

means for generating, during conversion from said multiple source error correction codes to said at least one destination error correction code, said plurality of destination check bits prior to a detection for errors in said multiple source error correction codes to ensure that said data bits are protected throughout said conversion;

means for detecting at least one data bit error in at least two of said multiple source error correction codes;

means for correcting said data bit errors; and means for correcting each of said destination check bits only if an odd number of said data bits in error were used for said generating of said destination check bit.

43. The system of claim 42 further comprising means for activating a flip bit of a plurality of flip bits upon detection of an erroneous data bit, wherein each said flip bit corresponds to one data bit and, when active, indicates that said one data bit is in error.

44. The system of claim 43 wherein said flip bits are grouped into one of at least one flip group such that no more than one flip bit may be active in a single flip group, said flip groups being further divided into multiple subgroups with each subgroup affecting a single destination check bit according to an H-matrix wherein said means for correcting comprises, for each erroneous destination check bit, means for performing an OR function on said flip bits in each subgroup affecting said erroneous destination check bit, and means for performing an exclusive OR function on said erroneous destination check bit and the results of said OR functions performed on said flip bits in said subgroup.

45. The system of claim 43, wherein said means for correcting said errors comprises means for complementing less than all of said data bits indicated as being in error by said active flip bits.

46. An article of manufacture comprising:

a computer useable medium having computer readable code means embodied thereon for protecting data during conversion from multiple source error correction codes to at least one destination error correction code, wherein said multiple source error correction codes and said at least one destination error correction code both comprise a set of data bits representing said data, and wherein said at least one destination error correction code further comprises a plurality of destination check bits to be generated from said set of data bits during conversion for protecting said data after conversion, the computer readable program code means in said article of manufacture comprising:

computer readable program code means for generating, during conversion from said multiple source error correction codes to said at least one destination error correction code, said plurality of destination check bits prior to a detection for errors in said multiple source error correction codes to ensure that said data bits are protected throughout said conversion;

computer readable program code means for detecting at least one data bit error in at least two of said multiple source error correction codes;

computer readable program code means for correcting said data bit errors; and computer readable program code means for correcting each of said destination check bits only if an odd number of said data bits in error were used for said generating of said destination check bit.

47. The article of manufacture of claim 46, further comprising computer readable program code means for activating a flip bit of a plurality of flip bits upon detection of an erroneous data bit, wherein each said flip bit corresponds to one data bit and, when active, indicates that said one data bit is in error.

48. The article of manufacture of claim 47 wherein said flip bits are grouped into one of at least one flip group such that no more than one flip bit may be active in a single flip group, said flip groups being further divided into multiple subgroups with each subgroup affecting a single destination check bit according to an H-matrix wherein said computer readable program code means for correcting comprises, for each erroneous destination check bit, computer readable program code means for performing an OR function on said flip bits in each subgroup affecting said erroneous destination check bit, and computer readable program code means for performing an exclusive OR function on said erroneous destination check bit and the results of said OR functions performed on said flip bits in said subgroup.

49. The article of manufacture of claim 47, wherein said computer readable program code means for correcting said errors comprises computer readable program code means for complementing less than all of said data bits indicated as being in error by said active flip bits.

* * * * *